(12) United States Patent
Arulambalam et al.

(10) Patent No.: US 8,521,955 B2
(45) Date of Patent: Aug. 27, 2013

(54) ALIGNED DATA STORAGE FOR NETWORK ATTACHED MEDIA STREAMING SYSTEMS

(75) Inventors: Ambalavanar Arulambalam, Macungie, PA (US); Richard J. Byrne, Hillsborough, NJ (US); Jeffrey L. Timbs, Austin, TX (US); Nevin C. Heintze, Worthington, OH (US); Silvester Tjandra, Singapore (SG); Eu Gene Goh, Singapore (SG); Nigamanth Lakshiminarayana, Bangalore (IN)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/039,642

(22) Filed: Mar. 3, 2011
(Under 37 CFR 1.47)

(65) Prior Publication Data
US 2013/0091237 A1 Apr. 11, 2013

Related U.S. Application Data

(63) Continuation-in-part of application No. 11/226,507, filed on Sep. 13, 2005, now Pat. No. 7,599,364, and a continuation-in-part of application No. 11/273,750, filed on Nov. 15, 2005, now Pat. No. 7,461,214, and a continuation-in-part of application No. 11/364,979, filed on Feb. 28, 2006, now abandoned, and a continuation-in-part of application No. 11/384,975, filed on Mar. 20, 2006, now Pat. No. 7,912,060.

(60) Provisional application No. 60/724,692, filed on Oct. 7, 2005, provisional application No. 60/724,464, filed on Oct. 7, 2005, provisional application No. 60/724,462, filed on Oct. 7, 2005, provisional application No. 60/724,463, filed on Oct. 7, 2005, provisional application No. 60/724,722, filed on Oct. 7, 2005, provisional application No. 60/725,060, filed on Oct. 7, 2005, provisional application No. 60/724,573, filed on Oct. 7, 2005.

(51) Int. Cl.
*G06F 13/00* (2006.01)

(52) U.S. Cl.
USPC .......................................... 711/114; 714/6.22

(58) Field of Classification Search
CPC ..... G06F 3/0689; G06F 3/067; G06F 3/0635; G06F 3/061
See application file for complete search history.

(56) References Cited

U.S. PATENT DOCUMENTS

| | | | |
|---|---|---|---|
| 5,243,596 | A | 9/1993 | Port et al. |
| 5,371,877 | A | 12/1994 | Drako et al. |

(Continued)

FOREIGN PATENT DOCUMENTS

EP     1691526     8/2006

OTHER PUBLICATIONS

ARM, AMBA AXI Protocol v1.0 Specification, 2003 108 pages.

(Continued)

*Primary Examiner* — Jung Park

(57) ABSTRACT

Described embodiments provide a server for transferring data packets of streaming data sessions between devices. A redundant array of inexpensive disks (RAID) array having one or more stripe sector units (SSU) stores media files corresponding to the one or more data sessions. The RAID control module receives a request to perform the write operation to the RAID array beginning at a starting data storage address (DSA) and pads the data of the write operation if the amount of data is less than a full SSU of data, such that the padded data of the write operation is a full SSU of data. The RAID control module stores the full SSU of data beginning at a starting data storage address (DSA) that is aligned with a second SSU boundary, without performing a read-modify-write operation.

19 Claims, 12 Drawing Sheets

(56) References Cited

U.S. PATENT DOCUMENTS

| | | | |
|---|---|---|---|
| 5,553,269 A | 9/1996 | Nunes | |
| 5,659,687 A | 8/1997 | Kim et al. | |
| 5,684,954 A | 11/1997 | Kaiserswerth et al. | |
| 5,937,169 A | 8/1999 | Connery et al. | |
| 5,958,067 A * | 9/1999 | Kaneda et al. | 714/6.1 |
| 5,974,482 A | 10/1999 | Gerhart | |
| 6,233,224 B1 | 5/2001 | Yamashita et al. | |
| 6,434,651 B1 | 8/2002 | Gentry | |
| 6,449,656 B1 | 9/2002 | Elzur et al. | |
| 6,453,394 B2 | 9/2002 | Miki et al. | |
| 6,567,967 B2 | 5/2003 | Greidinger et al. | |
| 6,643,259 B1 | 11/2003 | Borella et al. | |
| 6,697,868 B2 | 2/2004 | Craft et al. | |
| 6,732,252 B2 | 5/2004 | Miki et al. | |
| 6,788,704 B1 | 9/2004 | Lindsay | |
| 6,868,459 B1 | 3/2005 | Stuber | |
| 6,876,941 B2 | 4/2005 | Nightingale | |
| 6,885,673 B1 | 4/2005 | Tzeng et al. | |
| 6,901,072 B1 | 5/2005 | Wong | |
| 6,920,510 B2 | 7/2005 | Chang et al. | |
| 6,938,097 B1 | 8/2005 | Vincent et al. | |
| 7,035,291 B2 | 4/2006 | Grinfeld | |
| 7,085,866 B1 | 8/2006 | Hobson et al. | |
| 7,185,266 B2 | 2/2007 | Blightman et al. | |
| 7,236,492 B2 | 6/2007 | Davis et al. | |
| 7,287,102 B1 | 10/2007 | White et al. | |
| 7,366,837 B2 | 4/2008 | Corbett et al. | |
| 7,757,042 B2 * | 7/2010 | Yagisawa et al. | 711/114 |
| 2002/0032882 A1 * | 3/2002 | Mann et al. | 714/6 |
| 2002/0038379 A1 | 3/2002 | Sato et al. | |
| 2002/0080780 A1 | 6/2002 | McCormick et al. | |
| 2002/0091903 A1 | 7/2002 | Mizuno | |
| 2002/0194363 A1 | 12/2002 | Jha | |
| 2003/0067934 A1 | 4/2003 | Hooper et al. | |
| 2003/0086395 A1 | 5/2003 | Shanbhag | |
| 2004/0042483 A1 | 3/2004 | Elzur et al. | |
| 2004/0133713 A1 | 7/2004 | Elzur | |
| 2004/0153578 A1 | 8/2004 | Elzur | |
| 2004/0165538 A1 | 8/2004 | Swami | |
| 2004/0249957 A1 | 12/2004 | Ekis et al. | |
| 2005/0021680 A1 | 1/2005 | Ekis et al. | |
| 2005/0108555 A1 | 5/2005 | Sibert | |
| 2005/0165985 A1 | 7/2005 | Vangal et al. | |
| 2005/0213768 A1 | 9/2005 | Durham et al. | |
| 2005/0283570 A1 * | 12/2005 | Delahunt | 711/114 |
| 2006/0288235 A1 | 12/2006 | Goto | |

OTHER PUBLICATIONS

Tanenbaum, Andrew S., Structured Computer Organization, 1984, Prentice-Hall, Inc. pp. 10-12.

Information Sciences Institute, University of Southern California, Transmission Control Protocol Darpa Internet Program Protocol Specification, Sep. 1981, pp. 1-88, Marina del Rey, CA.

ARM, AMBA Specification, Rev. 2.0, ARM Ltd., 1999, 230 pages.

ARM926EJ-S Technical Reference Manual, ARM Ltd., 2001, 200 pages.

Specification for the Advanced Encryption Standard (AES), Federal Information Processing Standard (FIPS) Publication 197, (2001).

\* cited by examiner

FIG. 11
PRIOR ART

| DRIVE | DISK0 | DISK1 | DISK2 | DISK3 | DISK4 |
|-------|-------|-------|-------|-------|-------|
| | a | b | c | d | P |
| | e | f | g | P | h |
| | i | j | P | k | l |
| | m | P | n | o | p |
| | P | q | r | s | t |
| | u | v | w | x | P |

ALIGNED DATA STORAGE FOR NETWORK ATTACHED MEDIA STREAMING SYSTEMS

CROSS-REFERENCE TO RELATED APPLICATIONS

This application is a continuation in part of U.S. patent application Ser. No. 11/226,507, filed Sep. 13, 2005, now U.S. Pat. No. 7,599,364, and is a continuation in part of U.S. patent application Ser. No. 11/273,750, filed Nov. 15, 2005, now U.S. Pat. No. 7,461,214, and is a continuation in part of U.S. patent application Ser. No. 11/364,979, filed Feb. 28, 2006, now abandoned, and is a continuation in Part of U.S. patent application Ser. No. 11/384,975, filed Mar. 20, 2006, now U.S. Pat. No. 7,912,060, and claims the benefit of U.S. provisional patent application Nos. 60/724,692, filed Oct. 7, 2005, 60/724,464, filed Oct. 7, 2005, 60/724,462, filed Oct. 7, 2005, 60/724,463, filed Oct. 7, 2005, 60/724,722, filed Oct. 7, 2005, 60/725,060, filed Oct. 7, 2005, and 60/724,573, filed Oct. 7, 2005, all of which applications are expressly incorporated by reference herein in their entireties. The subject matter of this application is related to U.S. patent application Ser. No. 11/539,339, filed Oct. 6, 2006.

BACKGROUND OF THE INVENTION

1. Field of the Invention

The present invention relates to network attached media streaming systems incorporating Redundant Array of Inexpensive Disks (RAID) technology.

2. Description of Related Art

Current and emerging digital rights management (DRM) solutions include multi-level key management solutions. Keys used for Encryption/Decryption are derived from various intermediate keys to ultimately determine a title key for a media file. As an example, a master key will unlock a device key and, using the device key, a media key is unlocked. Using this media key, a title key is discovered. In this process, it is important that the decrypted keys are not exposed to users or processes outside the device to be used by a hacker.

Often, conventional approaches used a completely software-based approach in which the decryption keys were protected by software. Other approaches employed hardware assisted methods which exposed the keys. Exposed keys might provide backdoor access for a hacker, allowing the keys to become compromised.

To provide streaming writes to RAID arrays, conventional RAID systems might use a Read-Modify-Write sequence to write data to the RAID array. For example, FIG. 11 shows an exemplary convention RAID array using left-symmetric parity placement that distributes parity bits in a round robin manner across the drives of a disk array cluster. Parity chunks are rotated through the data chunks of stripes. FIG. 11 shows an array where there are five disks (N=5), where data chunks are represented by lower case characters while parity chunks are represented by the uppercase "P" character. As shown in FIG. 11, the set of sectors numbered [1,5,9,13] comprise a chunk of data on disk 1, whereas the sector set labeled [P0, P1,P2,P3] comprise a chunk of Parity on disk 4. A chunk might contain either parity or data.

To send data to a hard disk drive (HDD) and record parity information, the data are divided into sectors. Typically a RAID system records several sectors on a first HDD, several sectors on a second HDD, and several sectors on a third HDD, and then records the parity bits. To modify some of the stored data, the RAID system needs to first read all the stored data, then make changes to the stored data, and then write the data back to the disks. This sequence is referred to as a Read-Modify-Write operation.

The Read-Modify-Write operation handles data bursts that are not aligned with striped sector units. Misaligned data bursts can have partial data words at the front and back end of the burst. To calculate the correct parity sector value, a Read-Modify-Write module forms the correct starting and ending data words by reading the existing data words and combining them appropriately with the new partial data words.

However, the Read-Modify-Write operation blocks the write until the striped sector unit can be read and parity modified.

SUMMARY OF THE INVENTION

Described embodiments provide a server for transferring data packets of streaming data sessions between devices. A redundant array of inexpensive disks (RAID) array having one or more stripe sector units (SSU) stores media files corresponding to the one or more data sessions. The RAID control module receives a request to perform the write operation to the RAID array beginning at a starting data storage address (DSA) and pads the data of the write operation if the amount of data is less than a full SSU of data, such that the padded data of the write operation is a full SSU of data. The RAID control module stores the full SSU of data beginning at a starting data storage address (DSA) that is aligned with a second SSU boundary, without performing a read-modify-write operation.

BRIEF DESCRIPTION OF THE DRAWINGS

FIG. 11 is a diagram showing mapping of stripe sector units to physical drives in a conventional system.

DETAILED DESCRIPTION

Figure 1:
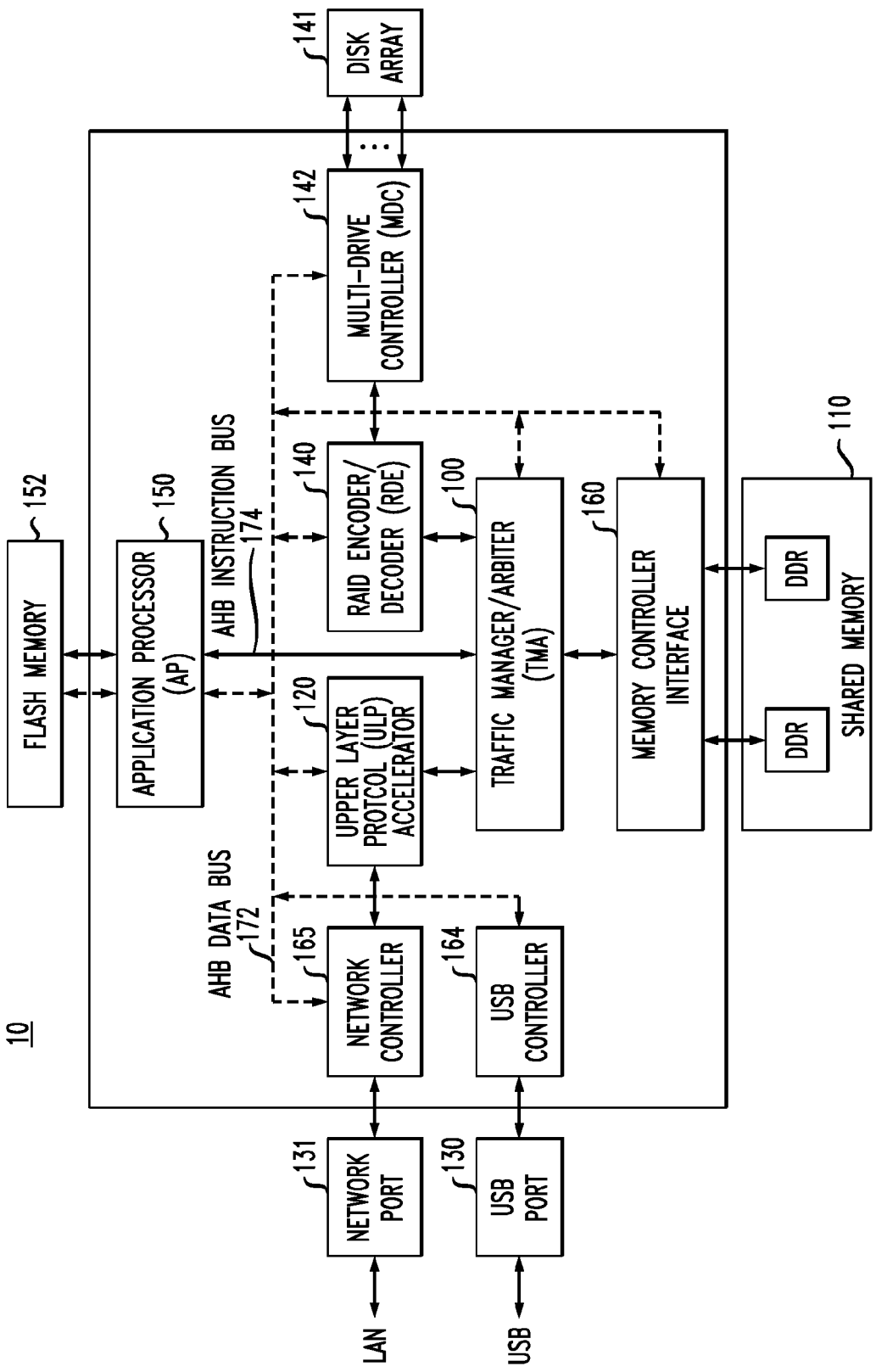
FIG. 1 is a block diagram of an exemplary network attached server (NAS) system for streaming media in accordance to embodiments of the present invention.

This description of the exemplary embodiments is intended to be read in connection with the accompanying drawings, which are to be considered part of the entire written description.

Table 1 defines a list of acronyms and terms employed throughout this specification as an aid to understanding the described embodiments of the present invention:

TABLE 1

| | | | |
|---|---|---|---|
| NAS | Network Attached Storage | SOC | System On Chip |
| USB | Universal Serial Bus | HDD | Hard Disk Drive |
| DVR | Digital Video Recorder | PVR | Personal Video Recorder |
| AP | Application Processor | RDE | RAID Decoder/Encoder |
| PATA | Parallel Advanced Technology Attachment, refers to an HDD interface | SATA | Serial Advanced Technology Attachment; refers to an HDD interface |
| PDU | Protocol Data Unit | FIS | Frame Information Structure for SATA |
| RAID | Redundant Array of Inexpensive Disks | RAID-x | RAID level "x" |
| RAID-0 | RAID level 0 specifies a block-interleaved disk array. | RAID-1 | RAID level 1 specifies a disk array with mirroring. RAID-1 supports redundancy, meaning that if one drive of the array fails, the data for the failed drive can be reconstructed from the remaining drives. A RAID system operating with a single drive identified as failed is said to be operating in a degraded mode. |
| RAID-4 | RAID level 4 specifies a block-interleaved dedicated parity disk array. RAID-4 supports redundancy, as described herein. | RAID-5 | RAID level 5 specifies a block-interleaved distributed parity disk array. RAID-5 supports redundancy, as described herein. |
| Sector | A sector is the basic unit of read and write operations and is a uniquely addressable set of predetermined size, for example 512 bytes. Sectors correspond to small arcs of tracks on disk drive platters that move past the read/write heads as the disk rotates. | DSU | Data Sector Unit—a sector's worth of data. |
| PSU | Parity Sector Unit—a sector's worth of parity as derived from a bit-wise exclusive-OR of the data in the N-1 data sector units of a stripe sector unit. | Chunks | An array's chunk size defines the smallest amount of data per write operation that should be written to each individual disk. Chunk sizes are integer multiples of sectors, and a chunk is the contents of its member sectors. |
| LBA | Logical Block Address—an LBA is a means of referring to sectors on a disk drive with a numerical address rather than the alternate sector of head on a cylinder method. With an LBA, sectors are numbered sequentially from zero to S-1, where S is the number of sectors on the disk. LBA length might vary depending on disk capacity, although a 48-bit LBA is common. | SSU | Stripe Sector Unit—a set of sectors, collected one from each disk array drive. The set of sectors in an SSU share the same LBA, thus a specific SSU is referenced by the common LBA of its member sectors. For a block-interleaved distributed parity disk array (e.g., RAID-5) with N number of drives, an SSU holds N-1 data sectors and one parity sector. |
| Stripes | A stripe is a set of chunks collected one from each disk array drive. In some embodiments, parity rotation through data is by stripes rather than by SSU. | DSA | Data Sector Address—refers to data sector units on a disk array with a numerical address. Data sectors might be numbered sequentially from zero to D-1, where D is the total number of DSUs in the RAID array cluster. PSUs are not included in DSAs (e.g., the sequential numbering is not advanced for PSUs). The exemplary DSA scheme might advance across an SSU. Stripes are not covered by first advancing through a chunk's worth of sectors on any one drive in the array. |
| AMBA | Advanced Microcontroller Bus Architecture | AHB | Advanced High-performance Bus |
| DDRSDRAM | Double Data Rate Synchronous Dynamic Random Access Memory | HEU | Header Encapsulation Unit |
| HCU | Header Construction Unit | PIU | Packet Integration Unit |
| TMA | Traffic Manger Arbitrator | ULP | Upper Layer Protocol |
| CID | Connection Identifier | QID | Queue Identifier |
| AMM | AP Memory Manager | OTP | One Time Programmable |
| AES | Advanced Encryption Standard | FIFO | First In, First Out |
| MDC | Multi-Drive Controller | HPU | Header Parsing Unit |
| CLU | Connection Look-up Unit | CAM | Content Addressable Memory |
| PCU | Payload Collection Unit | SAT | Sequence and Acknowledgement Table |
| RBM | Reassembly Buffer/disk Manager | PBM | Playback Buffer/disk Manager |
| FBM | Free Buffer pool Manager | LIFO | Last In, First Out |

TABLE 1-continued

| | | | |
|---|---|---|---|
| MAS | Memory Access Scheduler | MPS | Media Playback Scheduler |
| DAS | Disk Access Scheduler | QoS | Quality of Service |
| WOS | Write Operation Sequencer | ROS | Read Operation Sequencer |
| PBP | Parity Block Processor | BPR | Block Parity Reconstruction |
| AAI | Application Processor Interface | CSR | Control and Status Registers |
| RIF | Read Interface | WIF | Write Interface |
| TMI | Traffic Manager Interface | RAC | RAID Array Cluster |
| DID | Drive ID | PDID | Physical Drive ID |
| XCNT | Transfer Count | K | Chunk Size |
| ECC | Error Correction Codes | T | Transfer Type |
| PARROT | Parity Rotation | PSB | Parity Sector Buffer |
| WTRAN | Write Translate | WHIR | Write Header Information Requests |
| WDSU | Write Data Sector Unit | WPAD | Write Padded Sector |
| WPSU | Write Parity Sector Unit | WHER | Write Header Extraction Register |
| WCFR | Write Configuration Request Register | WOSM | Write Operation State Machine |
| DRM | Digital Rights Management | DMA | Direct Memory Access |

FIG. 1 is a block diagram of an exemplary home media server and network attached storage (NAS) system 10 for a home media server application, which might be implemented as a system on a chip (SOC). NAS system 10 is connected to input sources, such as via USB port 130 or network port 131, and one or more mass storage devices, such as a hard disk drive (HDD) array 141. In NAS system 10, data from multiple sessions are concurrently stored to disk array 141, or played out to devices (e.g., PCs, TVs, digital video recorders (DVRs), personal video recorders (PVRs), and the like, not shown) on a home network via USB port 130 or network port 131. USB port 130 and network port 131 might also be used for control traffic. The term "session" broadly encompasses any open connection that has activity. For example, a receive session is a connection in which data is being received from a media device, reassembled and stored in disk array 141 (or other mass storage device), and a transmit session is a connection in which data is being read out from disk array 141 to a media device (e.g., TV, stereo, computer or the like) for playback. A control session is a connection in which data is transferred between a network and application processor (AP) 150 for processor functions that operate NAS system 10 (e.g., retrieving data or instructions from shared memory 110, reading from or writing to registers). The sessions use a shared memory 110 as an intermediate storage medium.

AP 150 might be an embedded ARM926EJ-S core by ARM Holdings, plc, Cambridge, UK, or any other embedded microprocessor. In FIG. 1, AP 150 is coupled to other elements of the system by at least one of two different buses: instruction bus 174 and data bus 172. In some embodiments, both instruction and data buses 174 and 172 are AMBA AHB buses. AP 150 is coupled to Traffic Manger Arbitrator (TMA) 100 and flash memory 152 via instruction bus 174 and data bus 172. TMA 100 includes an exemplary memory controller interface 160. TMA 100 manages i) storage of media streams arriving via network port 131, ii) handling of control traffic for application processing, and iii) playback traffic during retrieval from HDD array 141. TMA 100 controls the flow of all traffic among the network controller 165, USB controller 164, AP 150, HDD array 141, and shared memory 110.

In some embodiments, shared memory 110 is implemented by a single-port DDR-2 DRAM. Double Data Rate (DDR) synchronous dynamic random access memory (SDRAM) is a high-bandwidth DRAM technology. Other types of memory might be used to implement shared memory 110. In some embodiments, disk array 141 is implemented as a 4-channel Serial Advanced Technology Attachment (SATA) hard disk array, although other types of storage devices, such as Parallel Advanced Technology Attachment (PATA) hard disks, optical disks, or the like might be employed.

AP 150 is also coupled, via a data bus 172, to Gigabit Ethernet media access control (GbE MAC) network controller 165, Upper Layer Protocol (ULP) accelerator 120, RAID decoder/encoder (RDE) module 140 (where RAID denotes redundant array of inexpensive disks), USB controller 164 and multi drive controller (MDC) 142.

AP 150 accesses shared memory 110 for several reasons. Part of shared memory 110 might generally contain program instructions and data for AP 150. AHB Instruction Bus 174 might access shared memory 110 to get instruction/program data on behalf of AP 150. Also, the control traffic destined for AP 150 inspection is stored in shared memory 110. In some embodiments, AHB instruction bus 174 has read access to shared memory 110, but the AHB data bus 172 is provided both read and write access to memory 110. AP 150 uses the write access to AHB data bus 172 to re-order data packets (e.g., TCP packets) received out-of-order. Also, AP 150 might insert data in and extract data from an existing packet stream in the shared memory 110.

AHB data bus 172 and AHB instruction bus 174 access shared memory 110 on behalf of AP 150 frequently. AHB data bus 172 is primarily used to access the internal register space and to access the data portion of the external shared memory. AHB instruction bus 174 is used to access instructions specific to AP 150, that are stored in shared memory 110. NAS system 10 receives media objects and control traffic from network port 131 and the objects/traffic are first processed by the local area network controller (e.g., Gigabit Ethernet controller GbE MAC 165) and ULP accelerator 120. ULP accelerator 120 transfers the media objects and control traffic to TMA 100, and TMA 100 stores the arriving traffic in shared memory 110. In the case of media object transfers, the incoming object data are temporarily stored in shared memory 110, and then transferred to RDE 140 for storage in disk array 141. TMA 100 also manages the retrieval requests from disk array 141 toward network port 131. While servicing media playback requests, data is transferred from disk array 141 and stored in buffers in shared memory 110. The data in the buffers is then transferred out to network controller 165 via ULP accelerator 120. The data are formed into packets for transmission using TCP/IP, with ULP accelerator 120 performing routine TCP protocol tasks to reduce the load on AP 150.

ULP accelerator 120 might generally offload routine TCP/IP protocol processing from AP 150. For example, ULP accelerator 120 might perform routine, high frequency calculations and decisions in hardware in real-time, while transferring infrequent, complex calculations and decisions to AP 150. ULP accelerator 120 might handle communication processing for most packets. For received packets, ULP accelerator 120 might extract one or more header fields of a received packet and perform a lookup to determine a destination for the received packet. ULP accelerator 120 might also tag a received packet from a previously-established connection with a pre-defined Queue Identifier (QID) used by TMA 100 for traffic queuing. ULP accelerator 120 might route packets received from new or unknown connections to AP 150 for further processing. Thus, ULP accelerator 120 provides a received packet to either i) disk array 141 via RDE 140 if the packet contains media content from a previously-established connection, or ii) AP 150 for further processing if the packet contains a control message or the packet is not recognized by ULP accelerator 120. In either case, TMA 100 might temporarily buffer received packets in shared memory 110.

For transmitted packets, ULP accelerator 120 receives a data transfer request from TMA 100. The source of data might be disk array 141 (for a media stream), AP 150 (for a control message), or ULP accelerator 120 itself (for a TCP acknowledgement packet). Regardless of the packet source, ULP accelerator 120 might encapsulate an Ethernet header (e.g., a TCP header and an IP header) for each outgoing packet and then provide each packet to network interface 165 or USB controller 164.

Figure 2:
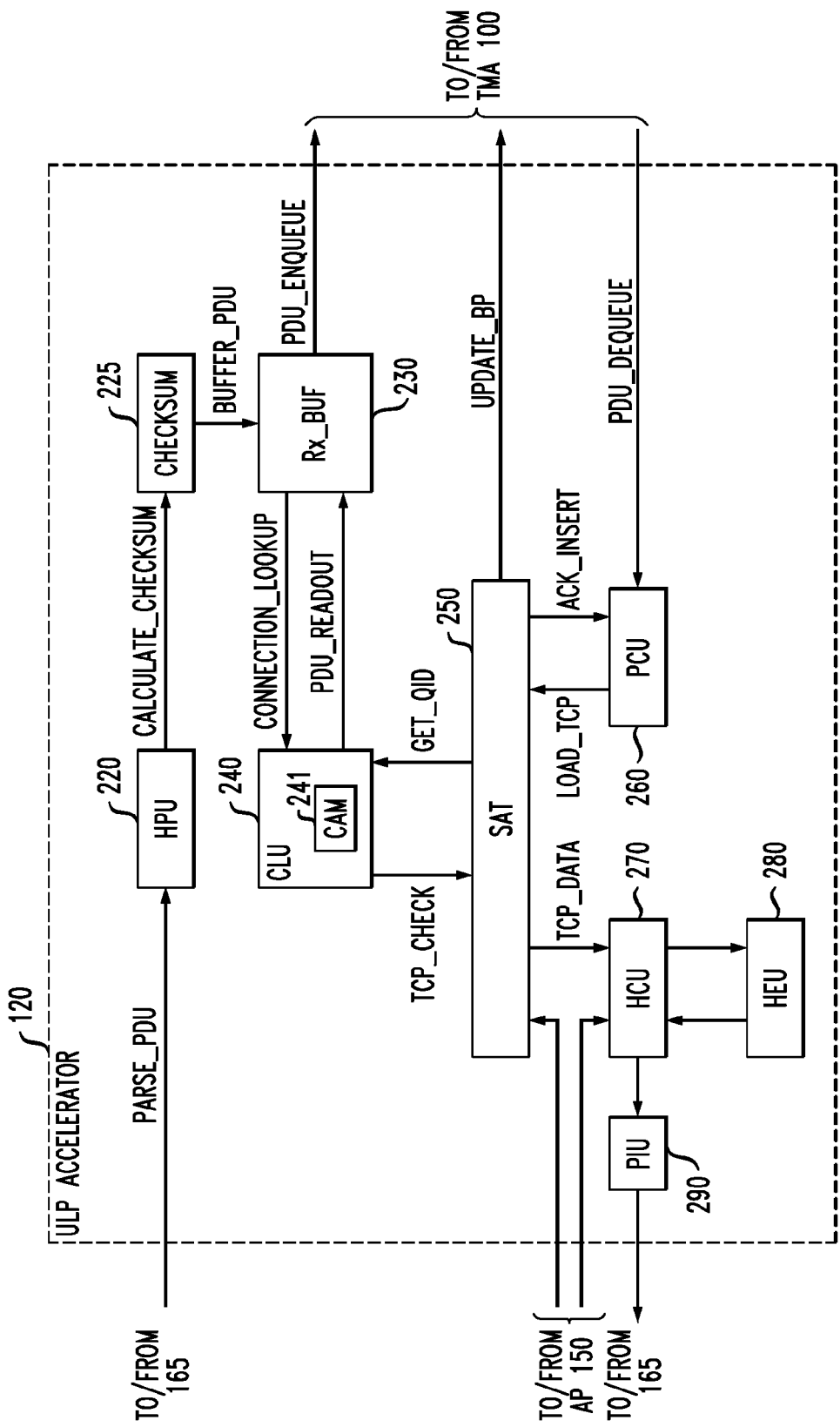
FIG. 2 is a block diagram of an exemplary ULP accelerator of the system shown in FIG. 1.

FIG. 2 shows greater detail of ULP accelerator 120 in NAS system 10. As shown in FIG. 2, NAS system 10 includes two separate data paths: a receive data path and a transmit data path. The receive path carries traffic from external devices, for example, via network controller 165 or USB controller 164, to TMA 100. The transmit path carries traffic from disk array 141 to external devices, for example, via network controller 165 or USB controller 164.

In the receive data path, ULP accelerator 120 receives packets, for example, Ethernet packets from network controller 165 or USB packets from USB controller 164. The L3 and L4 header fields of each packet are extracted by ULP accelerator 120. ULP accelerator 120 performs a connection lookup and decides where to send the received packet. An arriving packet from a previously-established connection is tagged with a pre-defined Queue ID (QID) used by TMA 100 for traffic queuing purposes.

A packet from a new or unknown connection might require inspection by AP 150. ULP accelerator 120 might tag the packet with a special QID and route the packet to AP 150. The final destination of an arriving packet after ULP accelerator 120 is either disk array 141 for storage (if the packet carries media content), or AP 150 for further processing (if the packet carries a control message or is not recognized by ULP accelerator 120). In either case, TMA 100 sends the packet to shared memory 110 for temporary buffering. To maintain streaming bandwidth, media data might be transferred between a client (not shown) and NAS system 10 in a bulk data transfer that is handled by hardware without processing by AP 150. In embodiments of the present invention, a bulk data transfer might be performed such as described in related U.S. patent application Ser. No. 11/364,979, filed Feb. 28, 2006.

In the transmit data path, ULP accelerator 120 receives a data transfer request from TMA 100. The source of data to be transferred might be disk array 141 (for a media stream), or ULP accelerator 120 itself (for control data, such as a TCP acknowledgement packet). Regardless of the traffic source, ULP accelerator 120 encapsulates an Ethernet header, an L3 (IP) header and an L4 (TCP) header for each outgoing packet and then sends the packet to one or more external devices, for example, via network controller 165 or USB controller 164, based on the destination port specified. In general, there are three sources for initiating data transmissions: 1) AP 150 can insert packets for transmission when necessary; 2) TMA 100 can stream data from disk array 141; and 3) ULP accelerator 120 can insert an acknowledge (ACK) packet when a timer expires. In the first two cases, data is forwarded to ULP accelerator 120 from TMA 100. In the third case, SAT 150 generates the data transfer request to ULP accelerator 120.

As shown in FIG. 2, ULP accelerator 120 processes received network packets in Header Parsing Unit (HPU) 220, which parses incoming data packets (PDUs), as indicated by signal PARSE_PDU, to determine where the L3 and L4 packet headers start, and delineates the packet boundary between different protocol levels by parsing the packet content. Checksum block 225 performs an L3 and L4 checksum on the incoming data packets to check packet integrity, as indicated by signal CALCULATE_CHECKSUM. Receive Buffer (RX_Buf) 230 buffers incoming packets for use by ULP accelerator 120, as indicated by signal BUFFER_PDU. TMA 100 is coupled to ULP accelerator 120, to provide ULP accelerator 120 with an interface to, for example, shared memory 110, as indicated by signals PDU_ENQUEUE, for placing data packets in a corresponding queue buffer, UPDATE_BP for updating one or more corresponding pointers of the queue buffer, such as a read or write pointer, and PDU_DEQUEUE, for removing data packets from a corresponding queue buffer.

Connection look-up unit (CLU) 240 is provided with received network data and extracts L3 and L4 fields to form a lookup address, as indicated by signal CONNECTION_LOOKUP, and maintains parameters that uniquely identify an established connection, for example a Connection ID (CID) in a connection table for use by AP 150 in locating buffer space in shared memory 110 corresponding to each connection. CLU 240 might use the L3 and L4 fields to form a look-up address for content addressable memory (CAM) 241. CAM 241 stores parameters that uniquely identify an established connection. An index of matched CAM entries provides a CID for look-up in the connection table. The queue ID (QID) used by TMA 100 to identify a queue buffer might generally be one of the connection parameters maintained by CLU 240. CAM 241 allows real-time extraction of the QID within the hardware of ULP accelerator 120, as indicated by signal GET_QID. If an incoming packet does not match an entry in CAM 241, ULP accelerator 120 provides the packet to AP 150 for further processing.

Payload collection unit (PCU) 260 collects traffic from TMA 100 for transmission. Header encapsulation unit (HEU) 280 includes an encapsulation table of template L2, L3 and L4 headers to be added to each outgoing packet. Header Construction Unit (HCU) 270 builds the packet header according to the encapsulation table of HEU 280. Packet Integration Unit (PIU) 290 assembles a packet by combining packet header data and payload data to form outgoing packets. AP 150 controls the setup of ULP accelerator 120.

Sequence and Acknowledgement Table (SAT) 250 maintains a SAT table to track incoming packet sequence numbers and acknowledgement packets for received and transmitted data packets. The SAT table might be used for TCP/IP connections, or other connection oriented protocols. SAT 250 performs transport layer processing, for example, protocol specific counters for each connection and the remaining object length to be received for each CID. In general, SAT 250 might also offload most TCP operations from AP 150, for example, updating sequence numbers, setting timers, detecting out-of-sequence packets, recording acknowledgements, etc., as indicated by signals TCP_DATA, LOAD_TCP and ACK_INSERT. In embodiments of the present invention, ULP accelerator 120 might be implemented such as described in related U.S. patent application Ser. No. 11/226,507, filed Sep. 13, 2005 and Ser. No. 11/384,975, filed Mar. 20, 2006.

TMA 100 manages i) storage of media streams arriving via network port 131, ii) handling of control traffic for application processing, and iii) playback traffic during retrieval from disk array 141. TMA 100 controls the flow of all traffic among network controller 165, USB controller 164, shared memory 110, AP 150, and disk array 141. TMA 100 manages data storage to and retrieval from disk array 141 by providing the appropriate control information to RDE 140. Control traffic destined for inspection by AP 150 is also stored in shared memory 110, and AP 150 can read packets from shared memory 110. AP 150 also re-orders any packets received out of order. A portion of shared memory 110 and disk array 141 might be employed to store program instructions and data for AP 150. TMA 100 manages the access to shared memory 110 and disk array 141 by transferring control information from the disk to memory and memory to disk. TMA 100 also enables AP 150 to insert data and extract data to and from an existing packet stream stored in shared memory 110.

Figure 3:
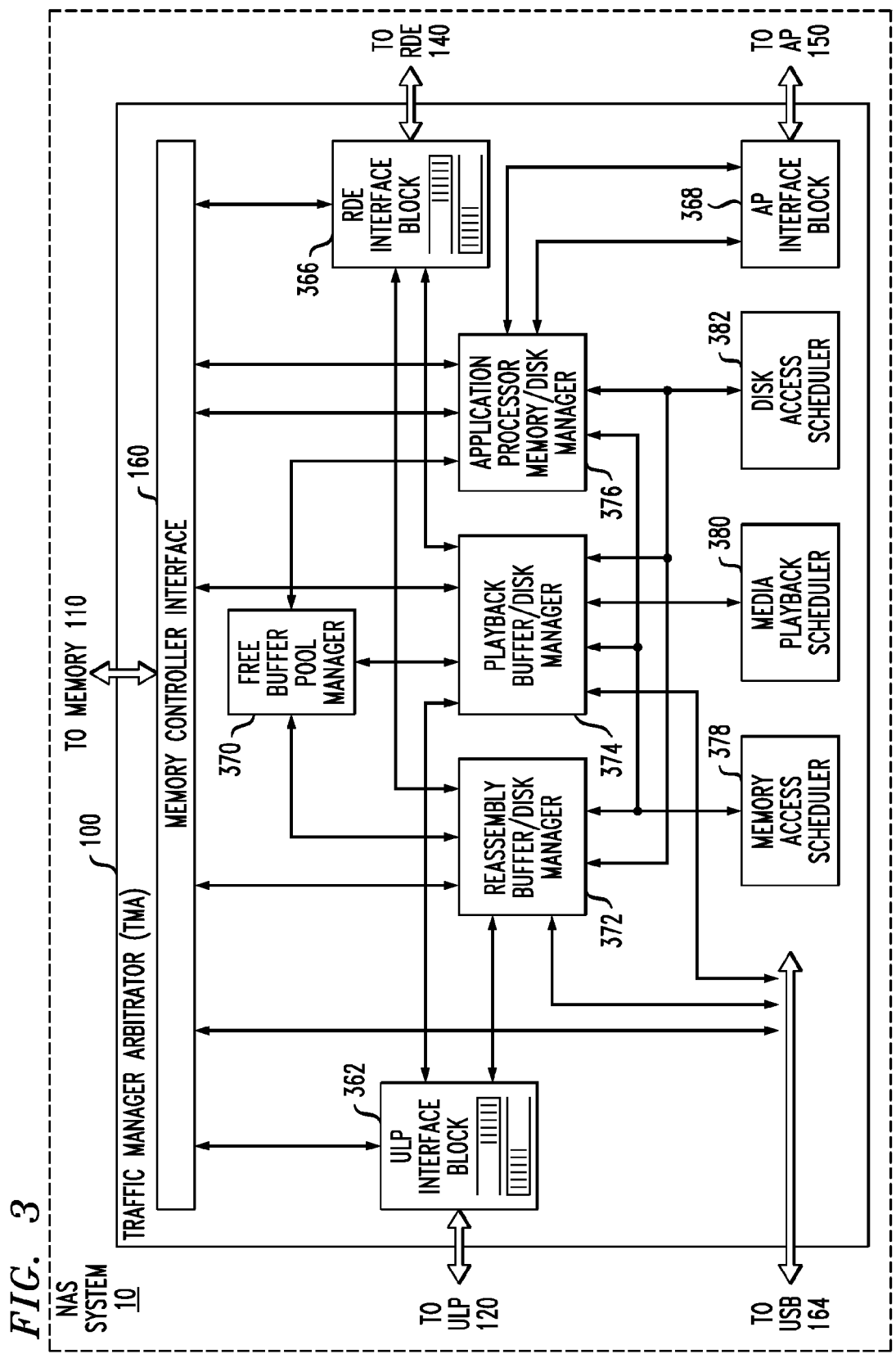
FIG. 3 is a block diagram of an exemplary TMA module of the system shown in FIG. 1.

TMA 100 is shown in greater detail in FIG. 3. TMA 100 interfaces to at least five modules/devices: 1) shared memory 110; 2) ULP accelerator 120, which might also interface to a network controller (e.g., 165); 3) USB controller 164; 4) one or more non-volatile storage devices, for example, disk array 141; and 5) AP 150. Memory controller interface 160 provides the interface for managing accesses to shared memory 110 via a single memory port, such as described in related U.S. patent application Ser. No. 11/273,750, filed Nov. 15, 2005. As shown in FIG. 3, TMA 100 includes memory controller interface 160, buffer managers 370, 372, 374 and 376 that handle memory buffer and disk management, and schedulers 378, 380 and 382 that allocate the available memory access bandwidth of shared memory 110. Reassembly buffer/disk manager (RBM) 372 manages the transfer of control packets or packetized media objects from network port 131 to shared memory 110 for reassembly, and then, if appropriate, the transfer of the control packets or packetized media objects to disk array 141. Media playback buffer/disk manager (PBM) 374 manages the transfer of data out of disk array 141 to shared memory 110, and then the transfer of data from shared memory 110 to ULP accelerator 120 or USB controller 164 during playback. Application processor memory manager (AMM) 376 provides an interface for AP 150 to disk array 141 and shared memory 110.

Free buffer pool manager (FBM) 370 allocates and de-allocates buffers when needed by the RBM 372, PBM 374 or AMM 376, and maintains a free buffer list, where the free buffer list might be stored in a last-in, first-out (LIFO) queue. Memory access scheduler (MAS) 378, media playback scheduler (MPS) 380, and disk access scheduler (DAS) 382 manage the shared resources, such as memory access bandwidth and disk access bandwidth. Schedulers 378, 380 and 382 also provide a prescribed quality of service (QoS), in the form of allocated bandwidth and latency guarantees for media objects during playback. MAS 378 provides RBM 372, PBM 374 and AMM 376 guaranteed memory access bandwidth. MPS 380 arbitrates among multiple media transfer requests and provides allocated bandwidth and ensures continuous playback without any interruption. DAS 382 provides guaranteed accesses to the disk for the re-assembly process, playback process and access by AP 150.

MAS 378 manages bandwidth distribution among each media session, while memory controller interface 160 manages all memory accesses via a single memory port of shared memory 110. MAS 378 and memory controller interface 160 of TMA 100 work together to make efficient and effective use of the memory access resources. MAS 378 might generally provide a prescribed QoS (by pre-allocated time slots and round-robin polling) to a plurality of data transfer requests having different request types. Each of the various types of media streams involves a respectively different set of data transfers to and from shared memory 110 that are under control of MAS 378. For example, memory write operations include i) re-assembly media write, ii) playback media write, iii) application processor data transfer from disk array 141 to shared memory 110, and iv) application processor write memory operations. Memory read operations include i) re-assembly read, ii) playback media read, iii) application processor data transfer from shared memory 110 to disk array 141, and iv) application processor read memory operations.

The re-assembly media write process might typically include four steps: 1) receiving data from network port 131 or USB port 130; 2) writing the data to shared memory 110; 3) reading the data from shared memory 110; and 4) writing the data to disk array 141. The playback media read process might typically include four steps: 1) accessing and receiving data from disk array 141; 2) writing the data to shared memory 110; 3) reading the data from shared memory 110; and 4) sending the data to network port 131 or USB port 130.

The application processor data transfer from memory 110 to disk array 141 might typically include two steps: 1) reading the data from shared memory 110; and 2) writing the data to disk array 141. Similarly, the application processor data transfer from disk array 141 to shared memory 110 might typically include two steps: 1) reading the data from disk array 141; and 2) writing the data to shared memory 110. Further, AP 150 might write to or read from shared memory 110 directly without writing to or reading from disk array 141.

Thus, as described herein, NAS system 10 receives media objects and control traffic from network port 131 and the objects/traffic are first processed by network controller 165 and ULP accelerator 120. ULP accelerator 120 transfers the media objects and control traffic to TMA 100, and TMA 100 stores the arriving traffic in shared memory 110. In the case of media object transfers, the incoming object data is temporarily stored in shared memory 110, and then transferred to RDE 140 for storage in disk array 141. TMA 100 also manages retrieval requests from disk array 141 toward network port 131. While servicing media playback requests, data is transferred from disk array 141 and buffered in shared memory 110. The data is then transferred out to network port 131 via ULP accelerator 120, which forms the data into packets for transmission using TCP/IP. TMA 100 manages the storage to and retrieval from disk array 141 by providing the appropriate control information to RDE 140. In embodiments of the present invention, TMA 100 might be implemented such as described in related U.S. patent application Ser. No. 11/273,750, filed Nov. 15, 2005.

Digital Rights Management ("DRM") solutions typically employ secure key processing to decrypt media files played on home media players to prevent the overall digital rights management from being compromised. Embodiments of the present invention might provide a localized key protection mechanism employing a hardware-based key management engine, and a subsystem for accelerated encryption/decryption of media content.

Figure 4:
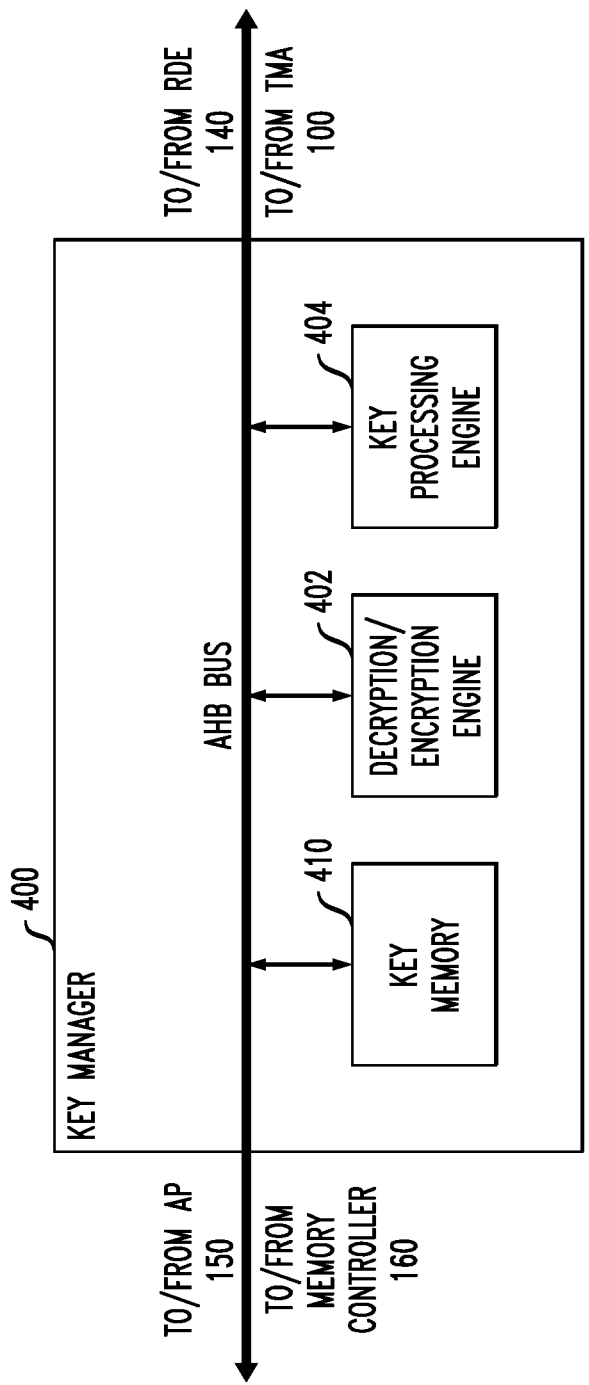
FIG. 4 is a block diagram of a secure key management system in accordance with embodiments of the present invention.

FIG. 4 shows an example of a system in which the keys are managed primarily in hardware, thus prohibiting any outside entity from gaining access to these keys. The exemplary secure key manager 400 includes key memory 410, key processing engine 404, and encryption/decryption engine 402. Key processing engine 404 might be implemented as a direct memory access (DMA) engine such as, for example an ARM PrimeCell PL080 by ARM Holdings, plc of Cambridge, UK, although other implementations might be employed. Encryption/Decryption Engine 402 might be implemented as an Advanced Encryption Standard (AES) core, such as a CS5210-40 core by Conexant Systems, Inc., Newport Beach, Calif., although other encryption/decryption engines and other encryption/decryption algorithms might be employed. As shown in FIG. 4, key manager 400 might be coupled to an Advanced Microcontroller Bus Architecture (AMBA) Advanced High-performance Bus (AHB), but any suitable type of data bus might be employed. Via the AHB Bus, key manager 400 might be in communication with other components of NAS system 10 shown in FIG. 1, such as AP 150, Memory Controller 160, RDE 140 and TMA 100.

Figure 5:
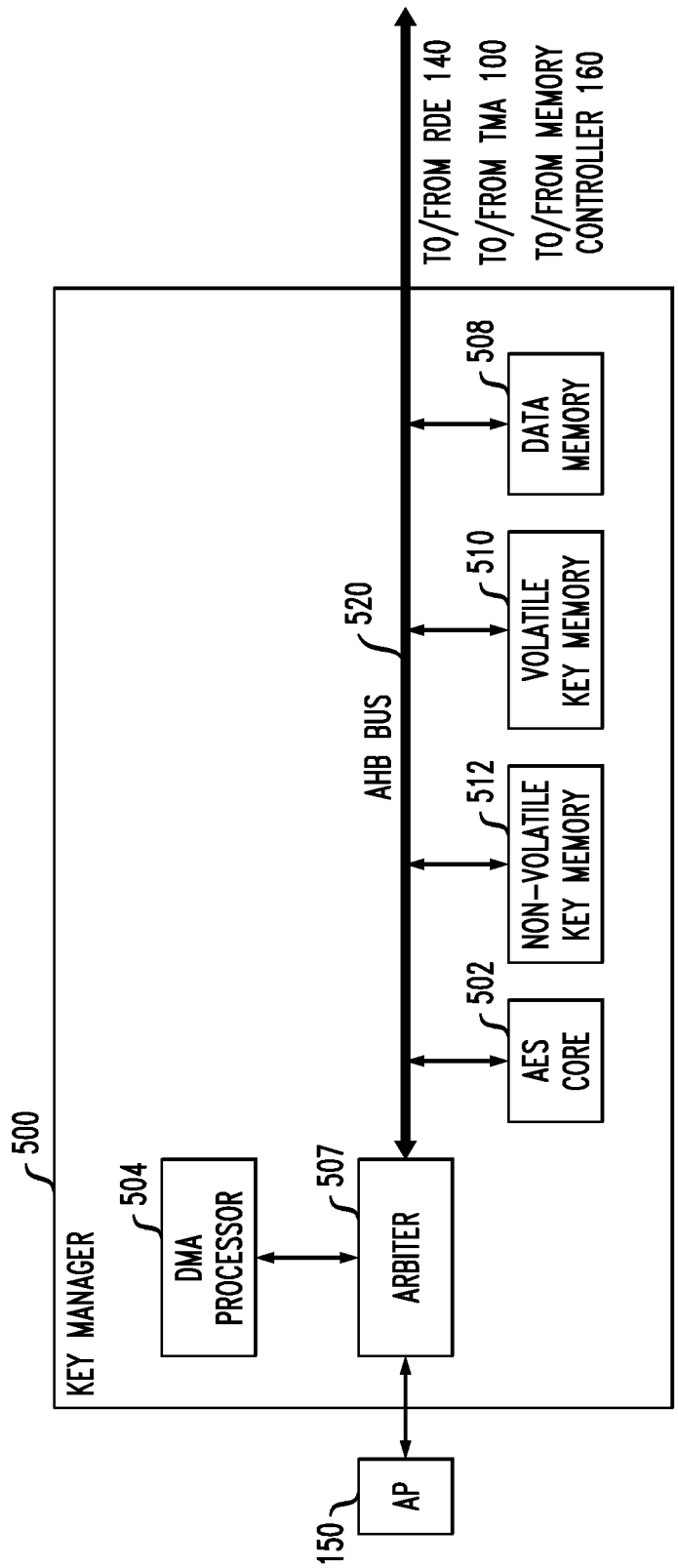
FIG. 5 is a block diagram of an exemplary home network attached storage (NAS) server including the secure key management system of FIG. 4.

FIG. 5 shows an exemplary media server key manager 500, which might be used for a home media server application. As shown in FIG. 5, decryption/encryption engine 402 might be implemented as AES core 502, which operates in accordance with the Advanced Encryption Standard (AES). Also as shown in FIG. 5, key processing engine 404 might be implemented as a direct memory access (DMA) processor, shown as DMA processor 504. In other embodiments, key processing engine 404 might be any module that moves data efficiently between non-volatile memory 512 and AES Core 502 and key memory 510 without making the data available to AP 150, such as a function built into TMA 100.

As described herein, intermediate storage is provided in memory 110 for storing incoming streaming data from network port 131 or while streaming out data from disk array 141 to network port 131. Control traffic arriving from network port 131 is also managed in memory 110. Shared memory 110 might include one or more buffer queues (shown as 661 in FIG. 6) to manage simultaneous data streams.

As described herein, NAS system 10 might simultaneously receive data from multiple sessions to be i) stored to disk array 141, ii) played out to devices on a home network (e.g., via network port 131), or iii) used for control traffic. Buffer queues 661 are employed to manage the various traffic flows. TMA 100 is employed to manage the traffic and bandwidth of shared memory 110. Data memory 508 provides intermediate storage, for example, for queuing or buffering encrypted payload data to be decrypted or the decrypted payload data.

Non-volatile key memory 512 might be used to store a set of one or more master keys. In some embodiments, to enhance security, non-volatile key memory 512 can only be written once (e.g., key memory 512 is a one-time programmable (OTP) memory). The master keys stored in non-volatile key memory 512 are used to decrypt keys that are stored in external memory (e.g., flash memory 152) by the media server manufacturer. The master keys are also programmed to non-volatile key memory 512 during the device manufacturing process.

In some embodiments, read access to the master keys in non-volatile key memory 512 is limited to DMA Key Processing Engine 504 (to the exclusion of AP 150). For example, as shown in FIG. 5, arbiter 507 might grant access of AHB Bus 520 to either AP 150 or DMA Key Processing Engine 504 at any given time, so that AP 150 cannot access AHB Bus 520 while DMA Processor 504 is reading decrypted keys from one of volatile key memory 510 or the output FIFO 663 (FIG. 6) of AES Core 502.

Due to the cost associated with memories employed by non-volatile key memory 512 and key memory 510, the amount of on-chip memory space might be limited. By storing encrypted keys in an optional external memory (e.g., flash memory 152), the total number of device specific keys that can be stored is extended. The device specific keys are encrypted, and the key (to decrypt the keys stored in flash memory 152) is programmed in non-volatile key memory 512.

When a decryption operation requiring a key is to be performed, AP 150 requests that DMA Processor 504 move a key from either non-volatile key memory 512 or key memory 510 to AES core 502. Once the key transfer is done, AP 150 inputs the data that are to be decrypted to AES core 502. Arbiter 507 then grants DMA Processor 504 access to AHB Bus 520, to the exclusion of AP 150. AES core 502 decrypts the key data, and the decrypted key is moved by DMA Processor 504 to volatile key memory 510. Arbiter 507 prevents access by AP 150 to the decrypted key stored in key memory 510.

In some embodiments, such as shown in FIG. 5, key memory 510 might be a volatile memory (e.g., random access memory), in which case the decrypted keys are automatically removed from memory when NAS system 10 is powered down. In other embodiments, key memory 510 might be an additional non-volatile memory. Thus, as described with regard to FIG. 5, embodiments of the present invention ensure that the master key is secure in non-volatile key memory 512 and will be accessed in a secure manner in order to decrypt any further keys.

DMA Processor 504 might also process the keys by performing pre-determined logical operations (i.e., XOR with another datum, or the like). The operand and the operators are specified by AP 150, however, at no time does AP 150 have access to any decrypted keys. Instead, AP 150 is provided a pointer to the decrypted key. When the decrypted key is to be used for decryption, AP 150 provides the pointer to DMA Processor 504, which moves the decrypted key from key memory 510 to the AES core 502.

In some embodiments, DMA processor 504 includes one or more DMA channels. For example, one of the DMA channels (i.e., CH0) might be dedicated to handling internal transfers of keys among the AES core 502, non-volatile key memory 512 and key memory 510. When an encrypted key stored in external memory, such as flash memory 152 is to be decrypted, AP 150 configures DMA CH0 with the following parameters: i) Source Addr=the address of the device key in non-volatile key memory 512, and ii) Dest Address=the address of key memory 510. When the DMA channel is thus programmed, DMA processor 504 sets access to AES output FIFO 663 (shown in FIG. 6). For example, DMA processor 504 sets a signal to a predetermined level (e.g., signal "dma_aes_allow_fifo_read" might be set to a logic low value). When this signal is set to the predetermined level (e.g., logic low), AES core 502 prevents any read of output FIFO 663 until the signal is set to another logic level (e.g., logic high). Thus, AP 150 is prevented from accessing AES output FIFO 663, which prevents any other process or user from obtaining the decrypted key.

Once DMA processor 504 completes the transfer of the master key to AES core 502, arbiter 507 is configured to allow AP 150 to read external flash memory 152 (e.g., via TMA 100) and load the encrypted device key in AES Input FIFO 665 (shown in FIG. 6), which enables the decryption operation in AES core 502. When AES core 502 completes the operation, AP 150 configures DMA processor 504 to read the decrypted key from AES output FIFO 665 and store it in internal key memory 510. For example, to store the decrypted key in key memory 510 when DMA processor 504 is the master of AHB bus 520, as enabled by arbiter 507, DMA processor 504 sets a control signal to a predetermined logic level, for example, a control signal "dma_aes_allow_fifo_read" might be set to logic high. DMA processor 504 reads the content of output FIFO 663 and stores it in internal key memory 510.

Figure 6:
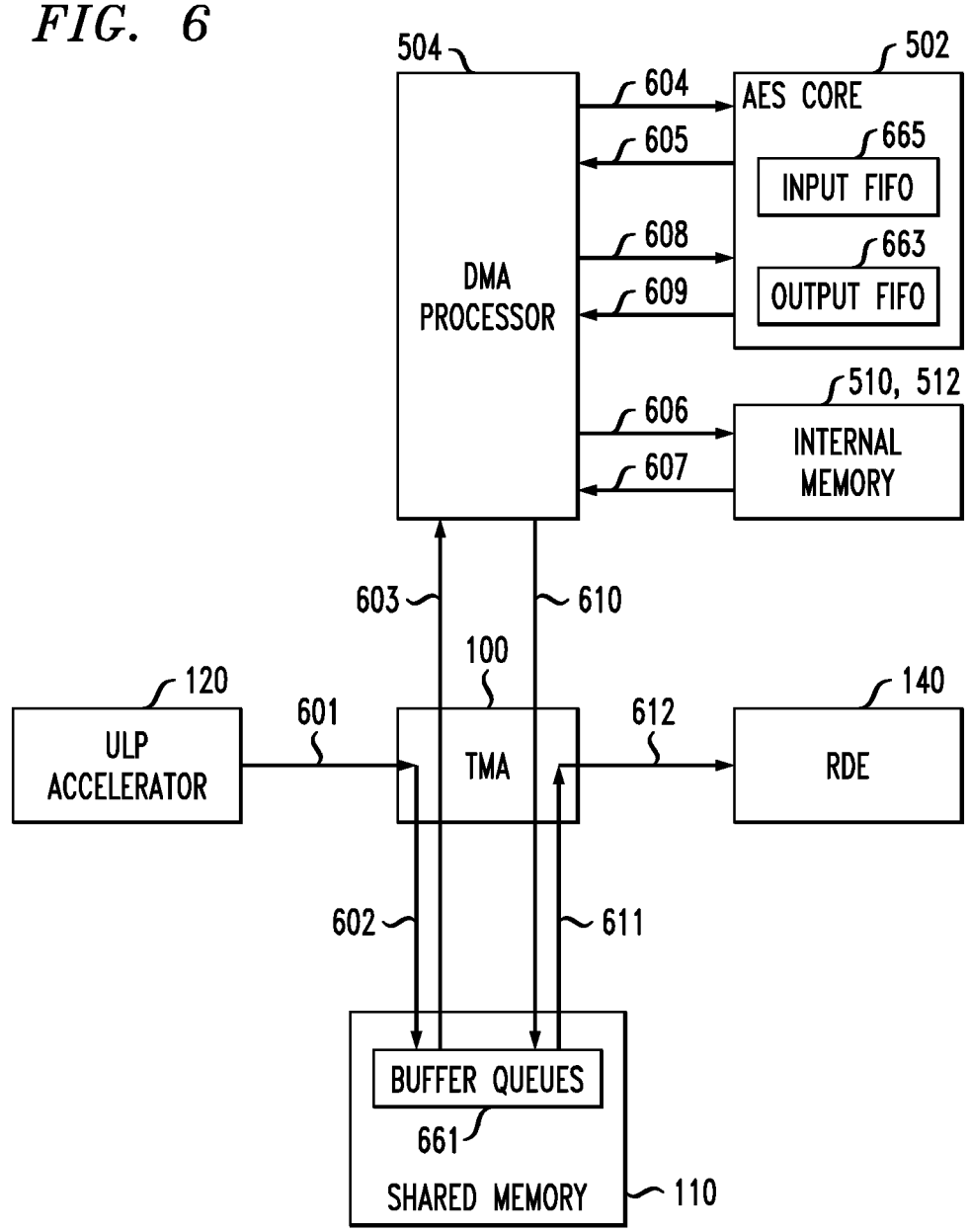
FIG. 6 is a data flow diagram showing exemplary data flows during a key decryption and data decryption operation in accordance with embodiments of the present invention.

FIG. 6 is a data flow diagram showing exemplary data flows during a key decryption and data decryption operation. Note that FIG. 6 only shows the subset of modules of FIG. 5 that are involved in the exemplary data flows discussed herein. This does not exclude elements of the system from participating in other data flows for other purposes.

As shown in FIG. 6, in data flow 601, one or more packets of data are received (e.g., received from network port 131, by way of the upper layer protocol (ULP) accelerator 120, which optionally offloads routine network, transport and application layer protocol processing from AP 150), and the received data packets are provided to traffic manager/arbitrator (TMA) 100. In data flow 602, TMA 100 stores the received data packets in intermediate buffer queues 661 in shared memory 110. The received data packets might be re-assembled and, in some embodiments, translated to accommodate the internal bus width of the NAS system 10, for example, AHB data bus 172.

In data flow 603, shared memory 110 outputs the data to be decrypted from the buffer queues 661 to DMA processor 504 via TMA 100. In data flow 604, DMA processor 504 moves the master key (from non-volatile key memory 512) and an encrypted device key (for example from one of flash memory 152 or data memory 508) to AES core 502 (e.g., input FIFO 665), and AES core 502 decrypts the device key using the master key. In data flow 605, once the device key is decrypted, DMA processor 504 reads the decrypted device key from AES output FIFO 663.

In data flow 606, DMA processor 504 delivers the decrypted device key to internal key memory 510, where it is stored. In data flow 607, DMA processor 504 retrieves the decrypted device key from internal key memory 510. In data flow 608, DMA processor 504 delivers the encrypted packet data to AES core 502 for decryption, along with the decrypted device key. This enables AES core 502 to perform the decryption operation on the encrypted packet data using the decrypted device key.

In data flow 609, DMA processor 504 reads the decrypted data from AES output FIFO 663. In data flow 610, DMA processor 504 delivers the decrypted data to TMA 100, which transmits the decrypted data to a buffer queue 661 in shared memory 110. In data flow 611, TMA 100 retrieves the decrypted data from the buffer queue 661 at an appropriate rate for forwarding the data to RDE 140. In data flow 612, TMA 100 delivers the decrypted data to RDE 140 for storage in disk array 141.

Figure 7:
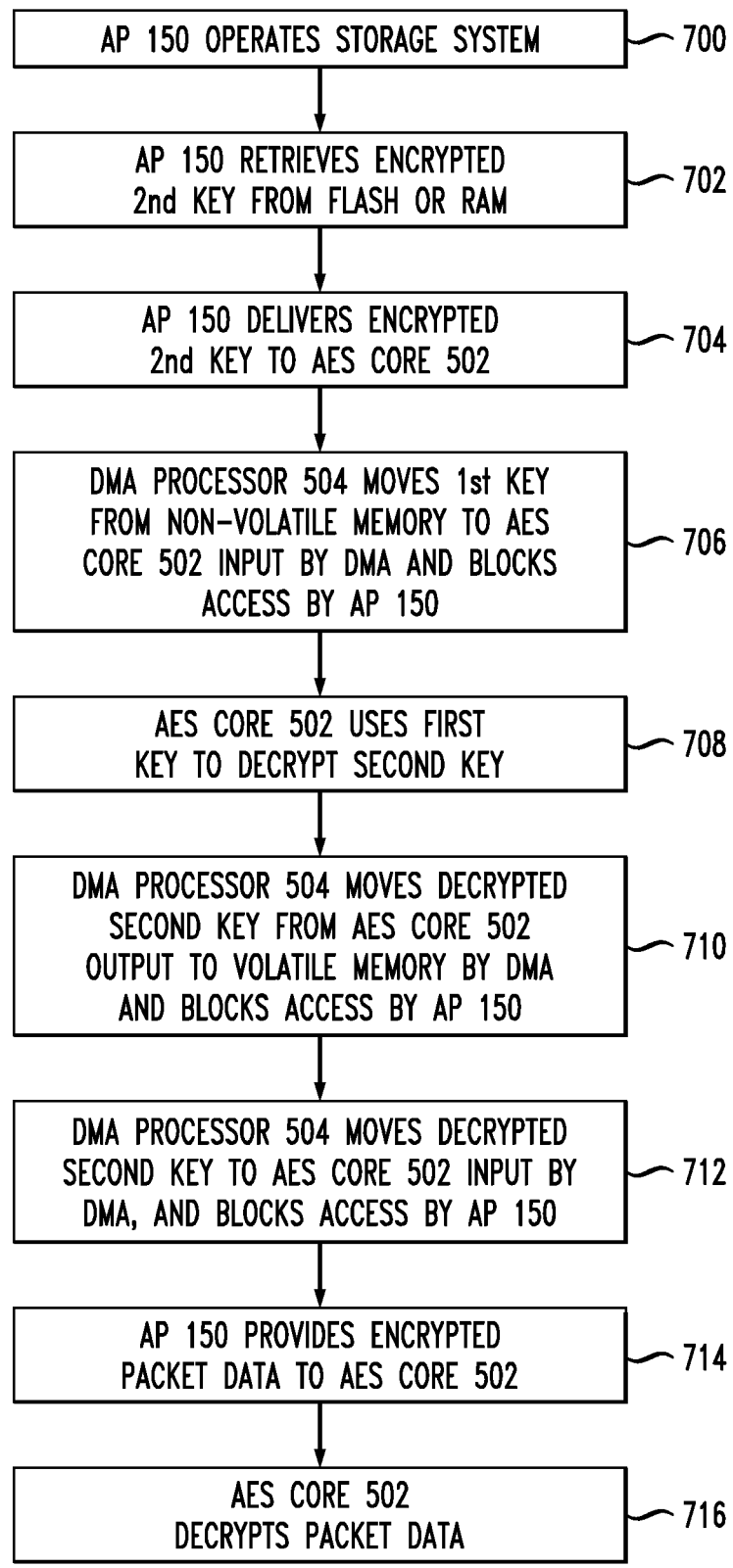
FIG. 7 is a flow chart showing a method of decrypting data in accordance with exemplary embodiments of the present invention

FIG. 7 is a flow chart of a method performed by NAS system 10. As shown in FIG. 7, at step 700 AP 150 controls operation of NAS system 10. For example, AP 150 might control DMA processor 504. At step 702, AP 150 retrieves an encrypted second key (the device key) from one of flash memory 152 or shared memory 110, in which the device key is stored.

At step 704, AP 150 delivers the encrypted second key to AES core 502. At step 706, DMA processor 504 moves a first key (the master key) from non-volatile memory 512 to AES core 502, for example by using direct memory access (DMA), while preventing AP 150 from accessing the first key. At step 708, AES core 502 uses the first key to decrypt the encrypted second key.

At step 710, DMA processor 504 moves the second key to key memory 510 from AES core 502, while preventing AP 150 from accessing the decrypted second key. At step 712, DMA processor 504 moves the second key from key memory 510 to AES core 502, while preventing AP 150 from accessing the decrypted second key. At step 714, AP 150 delivers the encrypted packet data to AES core 502 for decryption. At step 716, AES core 502 decrypts the encrypted packet data using the second key.

One of ordinary skill in the art would understand that the exemplary system and data flows described above can be extended to multiple levels of keys. The decrypted device key might be delivered by DMA processor 504 to the input of AES core 502 for decrypting an additional key, the additional key in turn used to decrypt the encrypted payload data.

Although an example is described above in which the decrypted device key is stored in the key memory 510, in other embodiments, the decrypted device key is re-encrypted with a different key (e.g., another master key stored in non-volatile key memory 512) by AES core 502 before AES core 502 stores the key in key memory 510. Although the examples described above include an encryption/decryption engine 402 that acts as the decryption engine, for the purpose of performing the decryption operations described above, a standalone decryption engine that provides the decryption functions might alternatively be used.

Described embodiments provide efficient data movement for encryption/decryption, and efficient key protection including hardware for decryption and storage of decrypted device keys. The optional inclusion of non-volatile memory 512 and key memory 510 allows a designer to extend the number of keys supported. Thus, the number of keys supported is variable.

Described embodiments provide a multi-level key management and processing engine that supports a master key to unlock device specific keys on a chip. The master keys might typically be programmed by the manufacturer of the device at the time of production, so that each vendor can select one or more master keys. Hardware acceleration of key management, encryption and decryption with minimal control processor intervention might provide improved performance while also providing the ability to hide the keys from the control processor (AP 150) to avoid hackers from modifying the boot up code to access any protected keys.

In some embodiments of the invention, sectors are always aligned on DSA boundaries, and write operations always being on SSU boundaries. As a result, the Read-Modify-Write (RMW) step can be eliminated.

Figure 8:
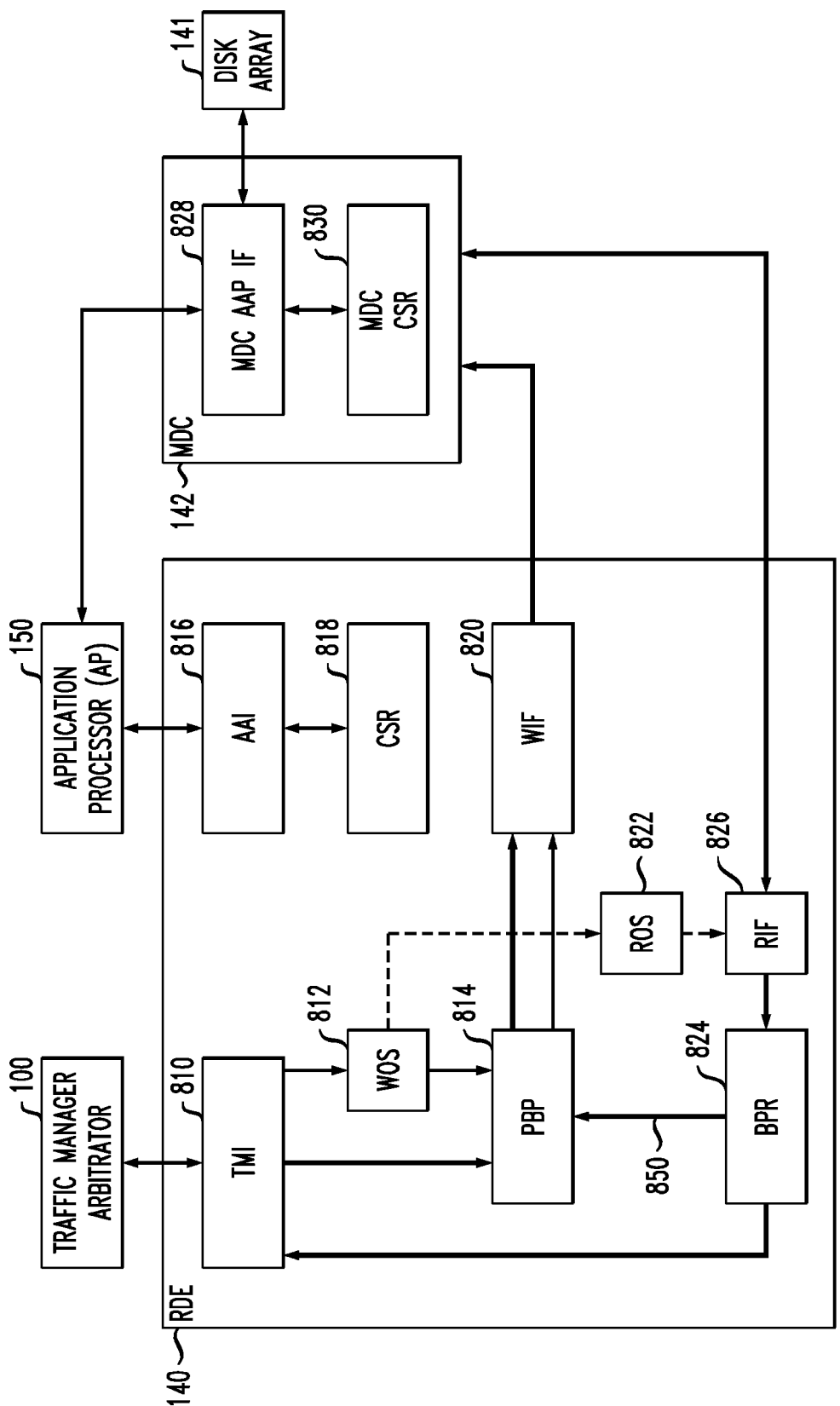
FIG. 8 is a block diagram of an exemplary RAID decoder/encode (RDE) module of the system shown in FIG. 1.

FIG. 8 shows a block diagram of exemplary RAID decoder/encoder (RDE) 140. As described herein, RDE 140 provides an interface between an HDD or HDD array, shown as disk array 141, and application processor (AP) 150, via multi-disk controller (MDC) 142. RDE 140 includes AP Interface (AAI) 816 to provide access to the memory-mapped AP 150 and its accessible registers and memories (not shown). RDE 140 includes Block Parity Reconstruction (BPR) module 824 to pass retrieved data to traffic manager interface (TMI) 810, which is connected to TMA 100. As described herein, TMA 100 receives incoming data streams from external systems or feeds (i.e., external to RDE 140), and handles playback transmission to external display and output devices. BPR 824 reconstructs the data when operating in degraded mode. The operation of BPR 824 is directed by read operation sequencer (ROS) 822. Parity block processor (PBP) 814 performs Block Parity Generation on SSU sector data as directed by the write operation sequencer (WOS) 812. MDC control and status registers (CSR) 830 are connected to MDC AP interface 828 to provide direct access by AP 150 to the registers of MDC 142.

Read interface (RIF) 826 retrieves responses to issued requests from a FIFO issued request queue (not shown) in WOS 812. RIF 826 performs Logical Drive Identification to Physical Drive Identification RAID array cluster (RAC) mapping as requested by ROS 822. A Drive Identification (DID) is presented to RDE 140 and MDC 142. ROS 822 checks responses to issued requests defined in the FIFO issued request queue of WOS 812. Write interface (WIF) 820 buffers requests for storage and retrieval operations and communicates the requests to MDC 142, to which disk array 141 is coupled. Write operations are executed as controlled by WOS 812. As WOS 812 writes these requests to a pending write FIFO of MDC 142, information is also written by WOS 812 to an issued request FIFO (not shown) of ROS 822. Storage request frames and Retrieval request frames are drawn into the Write Input Buffer Registers as requested by Write Operation State Machine (WOSM) described in regard to FIG. 9.

For write operations, data is provided to RDE 140 from traffic manager (TMA) 100 via TMI 810, passed through PBP 814, passed through WIF 820, and delivered to MDC 142 to be written to disk array 141. According to an exemplary embodiment, when an entire SSU is written in alignment with the DSA boundary, the signal indicated by arrow 850 between BPR 824 and PBP 814 is not needed. In embodiments in which SSUs are aligned to DSA boundaries, the data for the entire SSU are written and a new error correction code (ECC) for the entire SSU is generated without retrieving any prefix or suffix data from disk array 141. Thus, it is not necessary to stall the pipeline or to wait for a retrieval of data, data to update data in a buffer and perform a parity data write operation. Instead, in a RAID system with several types of disks in disk array 141 (e.g., SATA type HDD's, PATA type HDD's or the like) coupled to MDC 142, an SSU of data can be modified without first reading out all the data. With the SSUs aligned to the DSA boundary, RDE 140 writes out an entire SSU of data. Because the entire SSU of data is written to disk array 141, the system can calculate the correct ECC value without first reading data from disk, and a Read-Modify-Write operation is not needed.

Figure 10:
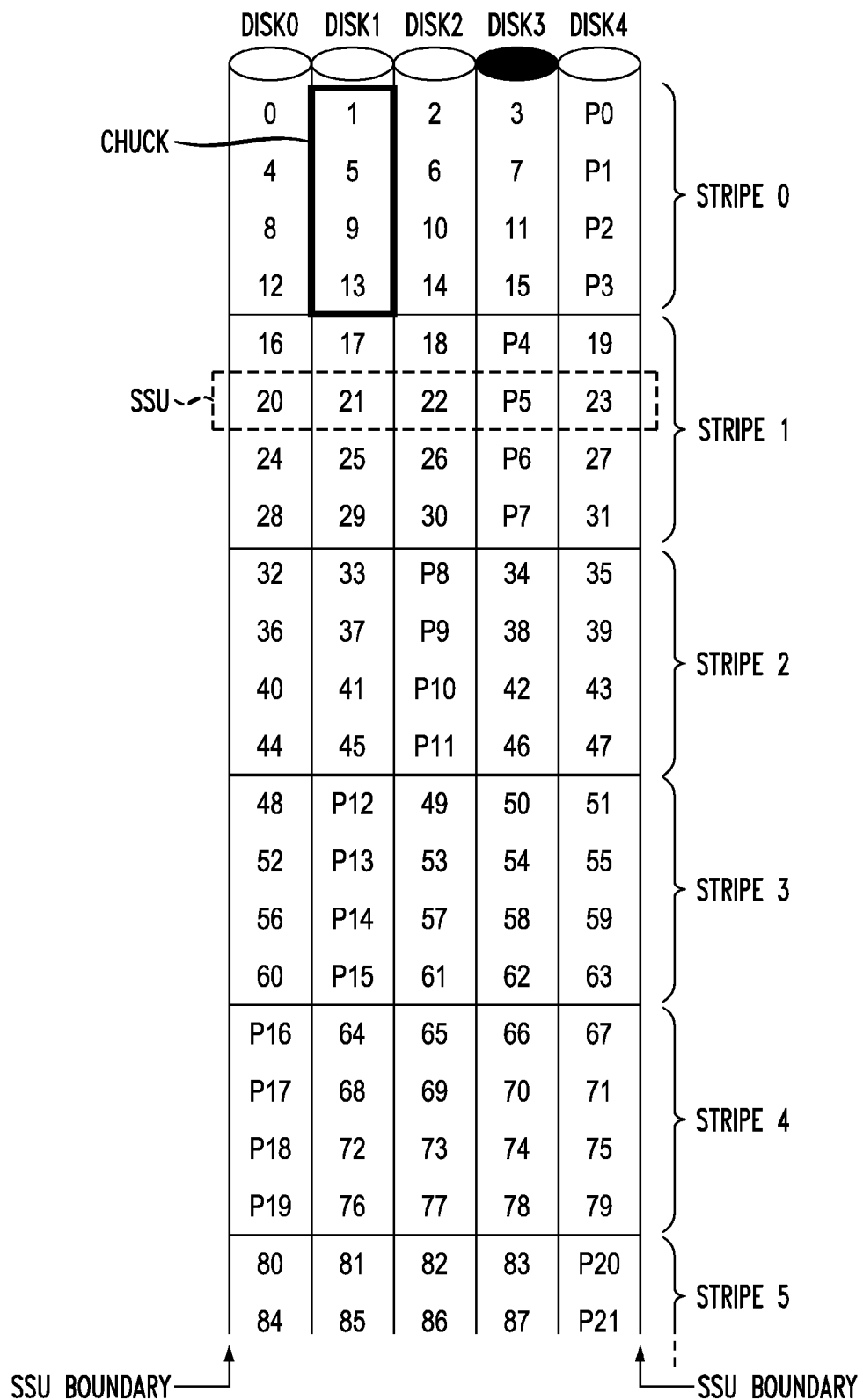
FIG. 10 is a diagram showing mapping of stripe sector units to physical drives in accordance with embodiments of the present invention.

FIG. 10 shows an example of DSA Data Sector Addressing. As shown in FIG. 10, an SSU is indicated by each row across the table. When a write operation is performed, a full SSU (row) is written out. Therefore, a Read-Modify-Write operation is not required to write that SSU out. The operating system ensures that the write operation is not delayed while data are read out, because no prefix or suffix data are needed.

In the exemplary embodiment, for write operations, TMA 100 only provides DSAs that are aligned on SSU boundaries. TMA 100 might include a first padding means for adding padding to any incomplete sector in the data to be stored, so as to include a full sector of data. If the transfer length is such that the storage operation does not complete on an SSU boundary, the SSU is filled out with padding bits (e.g., all ones or all zeroes). This obviates the need for read-modify-write operations, because the Read-Modify-Write operation is only performed for misaligned DSAs.

A lower boundary location of the payload data to be written is defined by the parameter SSU_DSU_OFFSET, and the payload data has a LENGTH. The last payload data location of the data to be stored is determined by the LENGTH and SSU_DSU_OFFSET. Because RDE 140 writes out a full SSU with each write, if the tail end of a storage request, as determined by the LENGTH plus SSU_DSU_OFFSET, intersects an SSU (i.e., ends before the upper SSU boundary), the remaining sectors of the SSU are written with padding (e.g., all zeros).

An exemplary procedure for ensuring that an entire SSU is written out with each write is below:

define SSU ((NUMBER_OF_DISKS-1)?1: (NUMBER_OF_DISKS-1)) xfersize is calculated to be:

$xfer$size=SSU*$N$(where $N$ is a variable integer). The xfersize is a programmable parameter per session (where each session represents a respective data stream to be stored to disk or retrieved from disk).

In some embodiments, after sending a request, the next request address is provided by a module external to RDE 140, such as TMA 100. The next request address is calculated as follows:

new DSA=old DSA+xfersize. The old DSA is the start address of an object, which might be selected by software depending on the start of the object and is selected to be an SSU boundary. This above exemplary procedure guarantees that the DSA is always aligned on an SSU boundary based on the selection of the xfersize.

When a data transfer is performed, the starting DSA is calculated based on three parameters: the starting address, the number of disks in use, and the transfer size. Based on these three factors, the starting DSA value is determined. The data are written to the first address, and then TMA 100 updates the data. Thus, the transfer size is used to ensure that SSUs are aligned after the starting DSA. In some embodiments, padding within a sector is done by TMA 100, and padding for an SSU is done by a second padding means in RDE 140. For example, while sending data that does not fill out a sector (e.g., the last sector has only 100 bytes of payload data, but the sector size is 512 bytes), TMA 100 pads the remainder of the full 512 bytes to generate a full, complete sector. Then, RDE 140 pads the rest of the SSU, if the last data to be written does not align with an SSU boundary. Thus, TMA 100 might perform padding of individual sectors, while RDE 140 might perform padding of individual SSUs. In some other embodiments, a module other than TMA 100 might insert pad data to fill out an incomplete sector to be written to disk array 141 and a module other than RDE 140 might insert pad data to fill out an incomplete SSU to be written to disk array 141.

A Read-Modify-Write operation would be necessary if either the head or tail of a storage request could straddle SSU boundaries, and SSU zero padding were not performed. At the head, this would require insertion of a specially marked retrieval request. At the tail, new retrieval and storage requests would be created. These extra tasks are avoided by writing full SSUs of data, aligned with a DSA boundary.

Header Information identified by the valid Start of Header assertion is transferred to the WOS 812 from TMI 810. WOS 812 calculates the LBA corresponding to the provided DSA. In addition to the LBA, the offsets of the requested payload data within the stripe and Parity Rotation are also obtained. The transfer length is distributed across disk array 141 and adjusted for any SSU offset (See "Length translations" below.) WOS 812 maintains a dword count in a Write Operation State Register (WOSR) (not shown). When the length translations, if any, are completed, WOS 812 loads the information into a Write Header Information Register (WHIR) and a Request Configuration Register (WCFR).

Figure 9:
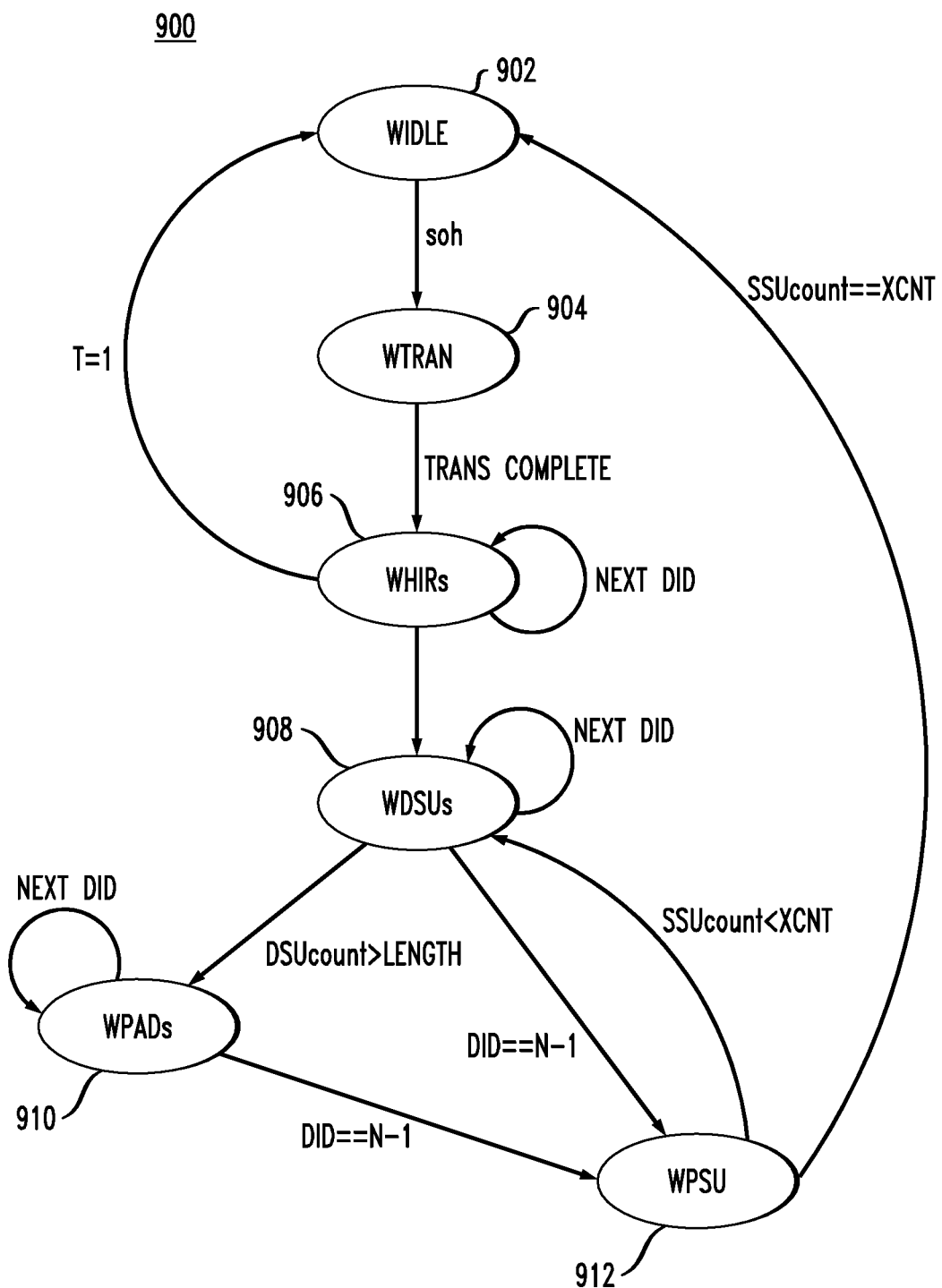
FIG. 9 is a state diagram for a write operation in accordance with embodiments of the present invention.

FIG. 9 is a simplified state diagram for Write Operation State Machine (WOSM) 900 employed by WOS 812. In WOSM 900, a RAID-4 operation is essentially performed, and other logic (not shown) handles the parity rotation. Storage request frames and Retrieval request frames are drawn into registers of a Write Input Buffer as requested by WOSM 900. WOS 812 identifies the type (e.g., read or write) of transfer (T), the RAC, the starting DSA, the length (in sectors), the session (QID), a dword count, the LBA corresponding to the provided DSA, the offsets within the stripe, and the parity rotation. The transfer length is distributed across the RAID cluster 144 and adjusted for any SSU offset. When the translations are completed, the information is loaded into the Header Information Register (WHIR) 210 and Request Configuration (WCFR) Register 208.

WIDLE state 902 is the Initial Idle or waiting for start of header resting state. WIDLE state 902 can be entered from either WHIRs state 906 or WPSU state 912. In WIDLE state 902, the system (e.g., WOS 812) is idle until it receives a start-of-header signal from TMA 100. Upon receiving the start-of-header signal, WOS 812 goes to the translation state, WTRAN state 904, and length translation begins.

WTRAN (Write Translate) state 904 is the state during which the DSA translation is performed by the computational logic. In WTRAN state 904, the header information extracted from the TMA request header is copied, manipulated and translated to initialize various registers of WOS 822. For example, a Write Header Extraction Register (WHER) of WOS 822 might store Header Information identified by a valid Start of Header assertion. This header information might include transfer type (T, where the type is, for example, read or write), RAID Array Cluster (RAC), starting DSA, LENGTH, and a session ID (QID). A Write Operation State Register (WOSR) of WOS 822 might store Current DID, Current DSA, current LBA, current stripe, current parity rotation, current offsets, SSU count, DSU count, sector count and dword count. A Write Configuration Request Register (WCFR) might store starting offsets, RAC, LENGTH, cluster size (N), chunk size (K), and stripe DSUs K*(N−1). (WHIR) might store transfer type (T), starting LBA, transfer count (XCNT), and QID. Also at WTRAN state 904, an entry corresponding to the transfer request is written to ROS 822. The entry might be stored in an issued request FIFO (not shown) of ROS 822. When translation is complete, the system goes from WTRAN state 904 to WHIRs state 906.

In WHIRs (Write Header Information Requests) state 906, translated header information is written to MDC 142 for each drive identifier (DID) of the operative RAID Array Cluster (RAC) Profile. After the translated header information for the last DID is completed, the system enters WDSUs state 908.

WDSUs (Write Data Sector Units) state 908, DSUs are presented in arrival sequence (RAID4_DID<N−1) to MDC 142. Sectors destined for degraded drives (where RAID5_DID matches ldeg and degraded is TRUE) are blanked, in other words they are not loaded into MDC 142. All of the data sector unit is written out to each DID of a stripe. When the sector unit for the DID N−1 is written, the system enters WPSU state 912. When the DSU count is greater than LENGTH, the system enters WPADs state 910.

In some embodiments, the second padding means for filling the final SSU of data is included in WOSM 900, for example, at WPADs (Write Padded Sectors) state 910 for adding the padding to complete an SSU. In state WPADs 910, Zero Padded sectors are presented sequentially (RAID4_DID<N−1) to MDC 142. Sectors destined for degraded drives (where RAID5_DID matches ldeg an degraded is TRUE) are blanked, in other words they are not loaded into MDC 142. The system remains in this state for each DID, until DID N−1, and then enters WPSU state 912.

WPSU (Write Parity Sector Unit) state 912 is the state in which the parity data are generated. In WPSU state 912, the PSU (RAID4_DID=N−1) is presented to MDC 142. Sectors destined for degraded drives (where RAID5_DID matches ldeg and degraded is TRUE) are blanked, in other words they are not loaded to be written to disk array 141. When SSUcount is less than the transfer count (XCNT), the system goes from WPSU state 912 to WDSUs state 908. When SSUcount reaches XCNT, the system returns to WIDLE state 902.

In one embodiment, WOSM 900 essentially performs RAID-4 processing all the time, and another separate circuit accomplishes the parity rotation (RAID-5 processing) by calculating where the data are and alternating the order at which the parity comes out. The drive ID used is the drive ID before parity rotation is applied. Essentially, the drive ID is the RAID-4 drive ID. Parity rotation is accomplished separately.

Logical DSA translations:

The LBA of an SSU can be obtained by dividing the DSA by one less than the number of drives in an array cluster. The remainder is the offset of the DSA within an SSU. For example, LBA=DSA/(N−1), and SSU_DSU_OFFSET=DSA mod (N−1).

The stripe number can be obtained by dividing the DSA by the product of the chunk size (K) and one less than the number of drives in an array cluster, with the remainder from the division being the OFFSET in DSUs from the beginning of the stripe. The STRIPE_SSU_OFFSET is the offset of the first DSU of an SSU within a stripe. For example, STRIPE=DSA/(K*(N−1)); STRIPE_DSU_OFFSET=DSA mod (K*(N−1)); STRIPE_SSU_OFFSET=STRIPE_DSU_OFFSET−SSU_DSU_OFFSET; and SSU_OF_STRIPE=STRIPE_SSU_OFFSET/(N−1).

Parity Rotation:

The Parity Rotation (PARROT) is the number of disks to rotate through from the "left-most" disk, and is the result of modulo division of the Stripe Number by the Number of drives. Parity rotation ranges from zero to one less than the number of drives in the RAID array. For example: PARROT=STRIPE mod N, where PARROT is in the range [0, N−1]

Drive Identifiers (DID)

Logical Drive Identifiers are used in operations that specify particular logical members of a RAID Array Cluster. DIDs range from zero to one less than the number of drives in the RAID array. Thus, DID is in the range [0, N−1]. Ignoring parity rotation, (as with RAID-4 systems), the logical disk drive number of the DSA within the SSU is the division's remainder. For example, RAID4_DID=DSA mod (N−1). The Parity Sector's Logical Drive ID is one less than the number of disks in the array cluster less the parity rotation. For example, PAR_DID=(N−PARROT−1).

The RAID5 drive ID is just what it would have been for RAID4, but adjusted for Parity Rotation. For example:

```
IF (RAID4_DID < PAR_DID)
    THEN RAID5_DID = RAID4_DID
ELSE
    RAID5_DID = RAID4_DID + 1
```

In degraded mode, the ldeg is known.

Given the Parity Rotation and the RAID5 drive ID, the Logical RAID4 drive ID can be obtained:

```
IF (RAID5_DID == (N − PARROT −1)) //PAR_DID?
    THEN RAID4_DID = N−1
```

```
ELSE IF (RAID5_DID < (N - PARROT -1))
    THEN RAID4_DID = RAID5_DID
ELSE
    RAID4_DID = RAID5_DID - 1
```

The Physical Drive Identifier (PDID) specifies the actual physical drive. The mapping of a RAID5_DID to the PDID is specified in the RAID Array Cluster's profile registers Length Translations The Length obtained from the TMA 100 is expressed in DSUs. The DSUs are to be distributed over disk array 141. For retrieval, any non-zero offset is added to the length if required in order to retrieve entire SSUs. This per-drive length is the operative number of SSUs. The number of SSUs is obtained by dividing the sum of the length and the offset by one less than the number of cluster drives, and rounding the quotient up. This Transfer count (XCNT) is provided FIFOs within MDC 142 corresponding to each particular drive of disk array 141 and is expressed in sectors. For example:

```
IF ((LENGTH + SSU_DSU_OFFSET) mod (N-1) = 0)
    THEN XCNT = (LENGTH + SSU_DSU_OFFSET)/(N-1)
ELSE
    XCNT = ((LENGTH + SSU_DSU_OFFSET)/(N-1))+ 1
```

Parity Block Processor (PBP):

PBP 814 performs block parity generation on SSU sector data as directed by WOS 812. As the first sector of a stripe unit data flows to WIF 820, the sector is also copied to a Parity Sector Buffer (PSB, not shown) of PBP 814. As subsequent sectors flow through PBP 814 to WIF 820, the PSB gets replaced with the exclusive-OR of its previous contents and the arriving data. When N-1 sector units have been transferred, the PSB is transferred and cleared.

The LENGTH field is in units of data sectors and represents the data that are to be transferred between RDE 140 and the TMA 100, which RDE 140 spreads over the entire array. The XCNT field is drive specific, and can include data and parity information that is not transferred between RDE 140 and TMA 100. Thus, XCNT might differ from LENGTH transfer count. XCNT is the parameter that goes to MDC 142. The amount of data written is the same for each disk, but the amount of data written is not the same as the length. The amount of data is the length divided by the number of drives minus one (because N-1 drives hold data, and one drive holds parity data). In some embodiments, sixteen bits are allocated to the LENGTH, and the unit of length is in sectors, so that individual transfers might be up to 64K sectors (32 megabytes for 512 B sectors).

Figure 12:
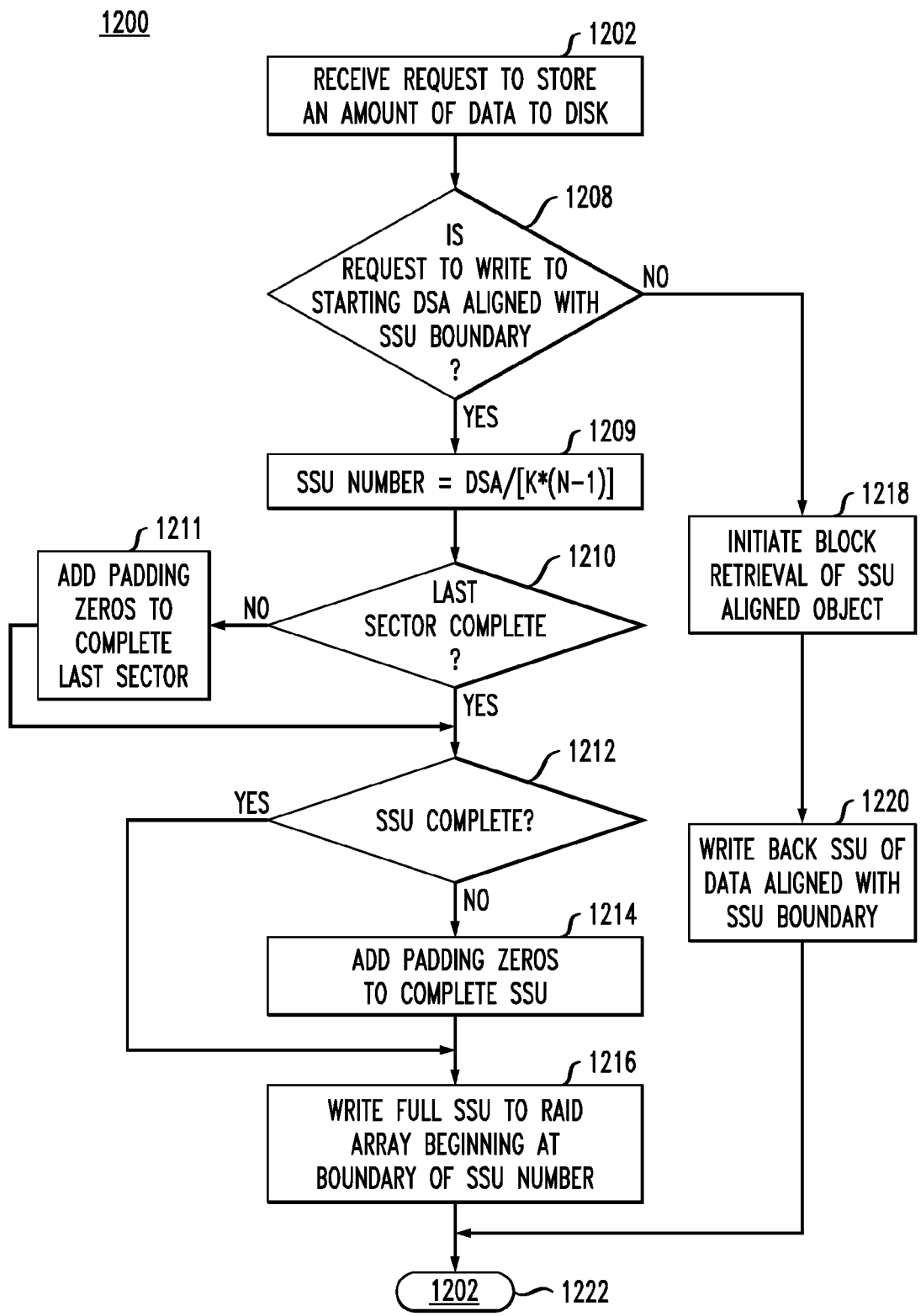
FIG. 12 is flow diagram of an exemplary method performed by the RDE module of the system shown in FIG. 1.

FIG. 12 is a flow diagram showing exemplary method 1200 implemented by RDE 140. At step 1202, a request is received from a requestor to write data to disk array 141. For example, TMA 100 might receive a write request to store data from a streaming media session. During normal operation, the requested starting DSA is aligned with the SSU boundary as described herein. However, the amount of additional data might be less than the size of a full SSU (or multiple SSUs). For example, in storing a large file to disk array 141, having a file size that is not an even multiple of the SSU size, the final portion of the additional data to be stored will have an amount that is less than the SSU size.

At step 1208, a determination is made whether the request is a request to write data to a starting DSA that is aligned with an SSU boundary. If the requested starting DSA is aligned with an SSU boundary, step 1209 is executed. If the requested starting DSA is not aligned with an SSU boundary, step 1218 is executed.

At step 1209, a stripe (SSU) number is determined by dividing the requested DSA by a product of a chunk size (K) of the RAID array and a number that is one less than a number of disks in the RAID array. At step 1210, a determination is made, for example by TMA 100, whether the last sector of data to be stored is complete. If the sector is complete, step 1212 is executed. If the sector is incomplete, step 1211 is executed.

At step 1211, any incomplete sector in the data to be stored is padded, so as to include a full sector of data. As described herein, this step might be performed by TMA 100. Upon receipt of a request to store data to disk array 141, TMA 100 determines a transfer size of the request. This value indicates the number of data sectors transferred per request and is tuned to optimize the disk access performance. As described herein, by dividing the amount of data by the sector size, an integer number of full sectors is determined, and a remainder indicates an incomplete sector. TMA 100 subtracts the number of actual data bytes in the incomplete sector from the sector size (e.g., 512 bytes), to determine an amount of padding data that TMA 100 adds at the end of the final sector when transmitting the final sector to RDE 140. This process is described in greater detail in application Ser. No. 60/724,464, which is incorporated by reference herein.

As described herein, in some embodiments, the means for padding data is included in RDE 140. In other embodiments, the means for padding data might include a first means in TMA 100, for example to pad incomplete sectors, and a second means in RDE 140, for example to pad incomplete SSUs. At step 1212, a determination is made whether the amount of data identified in the request corresponds to an integer number of complete SSUs. If the amount of data is an integer number of complete SSUs, step 1216 is executed next. If the amount of data includes an incomplete SSU, step 1214 is added.

At step 1214, the data to be stored are padded, so as to include a full SSU of data. At step 1216, the full SSU of data containing the requested DSA (and including the padding, if any) is stored, beginning at a starting DSA that is aligned with the SSU boundary, without performing a read-modify-write operation.

At step 1218, when a request is received to write to a starting DSA that is not aligned to an SSU boundary, RDE 140 initiate a block retrieval operation of an SSU aligned object. At step 1220, AP 150 might initiate a write operation to align the partial SSU along an SSU boundary, for example, by starting the write operation at an SSU boundary and filling any remainder of the SSU with padding data. Thus, a Read-Modify-Write operation such as described in steps 1218-1220 might only occur when a starting DSA of a received write request is not aligned to an SSU boundary. At step 1222, process 1200 returns to step 1202 to process any other received requests to write data to disk array 141.

In the example described above, a file-system suitable for handling large objects and specialized logic are used, avoiding RAID Array Read-Modify-Write operations. By using a file-system suitable for handling large objects, and beginning all RAID write operations with SSU aligned DSAs, and application of padding to the terminal S SU when appropriate, Read-Modify-Write operations are avoided. Once the initial aligned SSU is stored in disk array 141, with subsequent write operations (including the final portion of each file) sized to match the SSU size, each write operation has a starting DSA that is aligned on an SSU boundary, eliminating the Read-Modify-Write operation, and improving storage performance.

To protect the Array Data, the logic detects requests to write using errant DSAs (i.e., DSAs that are not SSU aligned) and modifies them. This logic might be implemented in TMA 100, or in software executed by AP 150. Logic for calculating the translation of DSAs ensures that the SSU_DSU_OFFSET is zero. Thus, writes are allowed to stream to the RAID Array without having to wait for a Stripe Read otherwise required for Parity calculations by PBP 814 for a Parity Sector Unit.

Although the invention has been described in terms of exemplary embodiments, it is not limited thereto. Rather, the invention should be construed broadly, to include other variants and embodiments of the invention, which might be made by those skilled in the art without departing from the scope and range of equivalents of the invention.

What is claimed is:

1. A server for transmitting and receiving data packets corresponding to one or more streaming data sessions between one or more playback devices over at least one network connection, the server comprising:
    a traffic manager adapted to, for a write operation of received data corresponding to the one or more data sessions, i) determine one or more header fields of the received data, and ii) provide a write request to a RAID control module;
    a control processor adapted to perform processing on the received data;
    a shared memory adapted to buffer received data;
    a storage medium adapted to store media files corresponding to the one or more data sessions, wherein the storage medium is a redundant array of inexpensive disks (RAID) array having one or more stripe sector units (SSU);
    the RAID control module configured to receive a request to perform the write operation to the RAID array beginning at a starting data storage address (DSA);
    means for padding the data of the write operation if the amount of data is less than a full SSU of data, such that the padded data of the write operation is a full SSU of data, wherein the RAID control module includes means for causing storage of the full SSU of data beginning at a starting data storage address (DSA) that is aligned with a second SSU boundary, without performing a read-modify-write operation.

2. The server of claim 1, wherein:
    in response to receiving a request to perform the write operation to the RAID array beginning at a starting data storage address (DSA) that is aligned with an SSU boundary:
    the RAID control module is further adapted to determine an SSU number of the request by dividing the requested DSA by a product of a chunk size (K) of the RAID array and a number that is one less than a number of disks in the RAID array;
    the traffic manager is further adapted to determine whether the last sector of data of the write operation is aligned with a sector boundary by dividing the amount of data of the write operation by a sector size of the RAID array; and
    the RAID control module is further adapted to write a full SSU of data containing the requested DSA to a stripe having the determined stripe number.

3. The server of claim 2, wherein the traffic manager adds padding to any incomplete sector in the additional data to be stored, so as to include a full sector of data, and the RAID control module adds padding to the additional data to be stored, so as to include a full SSU of data.

4. The server of claim 3, wherein the traffic manager is adapted to add padding to any incomplete sector by subtracting the number of data bytes in the incomplete sector from the sector size of the RAID array, wherein the result is the number of bytes to be padded.

5. The server of claim 4, wherein the padding comprises setting the bytes to be padded equal to a default value.

6. The server of claim 1, wherein the control processor is further adapted to:
    in response to receiving a request to perform the write operation to the RAID array beginning at a starting data storage address (DSA) that is not aligned with an SSU boundary:
        initiate a read-modify-write operation to i) read a block retrieval of an SSU aligned object, the SSU aligned object including the data located at the DSA in the request; ii) modify the SSU aligned object to include the data of the write operation, and iii) write an SSU of data to be written back to the RAID array, aligned with an SSU boundary and including the DSA identified in the request.

7. The server of claim 1, wherein the RAID control module is adapted to restrict write operations to the RAID array so as to only include storage of one or more full SSUs.

8. The server of claim 1, wherein the server further comprises:
    a memory arbiter adapted to manage accesses to the shared memory, wherein the shared memory is further adapted to store one or more keys corresponding to the one or more data sessions;
    a key manager comprising i) a first memory for storing at least one master key of the server, ii) a second memory for storing one or more keys corresponding to the one or more data sessions, and iii) an encryption/decryption processor adapted to encrypt and decrypt data; and
    an encryption/decryption processor that is adapted to:
        i) encrypt, using the at least one master key, the one or more keys corresponding to the one or more data sessions, and provide the encrypted one or more keys to the memory arbiter for storage to the shared memory, and
        ii) retrieve the encrypted one or more keys from the shared memory by way of the memory arbiter, and decrypt, using the at least one master key, the encrypted one or more keys, wherein the decrypted one or more keys are not accessible to modules outside of the key manager.

9. The server of claim 8, wherein the encryption/decryption engine is further adapted to employ the decrypted one or more keys to decrypt data packets for storage on the storage medium and encrypt data packets for transmission to the one or more playback devices.

10. A method of processing, by a media server, data packets corresponding to one or more streaming data sessions between one or more playback devices over at least one network connection, the method comprising:
    determining, by a traffic manager, one or more header fields of received data for a received write operation corresponding to the one or more data sessions, i) determine and ii) provide the received data to a RAID control module;
    receiving, by a RAID control module from the traffic manager, a request to perform the write operation to a storage medium of the server at a starting data storage address (DSA), wherein the storage medium is a redundant array of inexpensive disks (RAID) array having one or more stripe sector units (SSU);

padding the data of the write operation if the amount of data is less than a full SSU of data, wherein the padded data of the write operation is a full SSU of data;

writing, to the storage medium, the full SSU of data beginning at a starting data storage address (DSA) that is aligned with a second SSU boundary, without performing a read-modify-write operation.

11. The method of claim 10, wherein in response to receiving a request to perform the write operation to the RAID array beginning at a starting data storage address (DSA) that is aligned with an SSU boundary, the method further comprises:

determining, by the RAID control module, an SSU number of the request by dividing the requested DSA by a product of a chunk size (K) of the RAID array and a number that is one less than a number of disks in the RAID array;

determining, by the traffic manager, whether the last sector of data of the write operation is aligned with a sector boundary by dividing the amount of data of the write operation by a sector size of the RAID array; and writing, by the RAID control module, a full SSU of data containing the requested DSA to a stripe having the determined stripe number.

12. The method of claim 11, the method further comprising:

adding, by the traffic manager, padding to any incomplete sector in the additional data to be stored, so as to include a full sector of data; and adding, by the RAID control module, padding to the additional data to be stored, so as to include a full SSU of data.

13. The method of claim 12, wherein the step of adding, by the traffic manager, padding to any incomplete sector in the additional data to be stored, so as to include a full sector of data further comprises:

subtracting the number of data bytes in the incomplete sector from the sector size of the RAID array, wherein the result is the number of bytes to be padded.

14. The method of claim 13, wherein the padding comprises setting the bytes to be padded equal to a default value.

15. The method of claim 10, wherein in response to receiving a request to perform the write operation to the RAID array beginning at a starting data storage address (DSA) that is not aligned with an SSU boundary, the method further comprises:

initiating, by a control processor, a read-modify-write operation to i) read a block retrieval of an SSU aligned object, the SSU aligned object including the data located at the DSA in the request; ii) modifying the SSU aligned object to include the data of the write operation, and iii) write an SSU of data to be written back to the RAID array, aligned with an SSU boundary and including the DSA identified in the request.

16. The method of claim 10, further comprising:

restricting, by the RAID control module, write operations to the RAID array so as to only include storage of one or more full SSUs.

17. The method of claim 10, further comprising:

managing accesses to a shared memory, by a memory arbiter, wherein the shared memory is stores one or more keys corresponding to the one or more data sessions;

storing, by a key manager, at least one master key of the server and one or more keys corresponding to the one or more data sessions;

encrypting, by an encryption/decryption processor, using the at least one master key, the one or more keys corresponding to the one or more data sessions, and providing the encrypted one or more keys to the memory arbiter for storage to the shared memory; and retrieving, by the encryption/decryption processor, the encrypted one or more keys from the shared memory by way of the memory arbiter, and decrypting, using the at least one master key, the encrypted one or more keys, wherein the decrypted one or more keys are not accessible to modules outside of the key manager.

18. The method of claim 17, further comprising:

employing the decrypted one or more keys to decrypt data packets for storage on the storage medium and to encrypt data packets for transmission to the one or more playback devices.

19. The method of claim 10, wherein the method is implemented by a machine executing program code encoded on a non-transitory machine-readable storage medium.

* * * * *